(12) United States Patent
Rogers, Jr. et al.

(10) Patent No.: US 8,769,373 B2
(45) Date of Patent: Jul. 1, 2014

(54) METHOD OF IDENTIFYING AND PROTECTING THE INTEGRITY OF A SET OF SOURCE DATA

(76) Inventors: Cleon L. Rogers, Jr., Little Rock, AR (US); Glen T. Logan, Alexandria, VA (US)

(*) Notice: Subject to any disclaimer, the term of this patent is extended or adjusted under 35 U.S.C. 154(b) by 0 days.

(21) Appl. No.: 13/514,178

(22) PCT Filed: Oct. 5, 2010

(86) PCT No.: PCT/US2010/002682
§ 371 (c)(1),
(2), (4) Date: Aug. 9, 2012

(87) PCT Pub. No.: WO2011/119137
PCT Pub. Date: Sep. 29, 2011

(65) Prior Publication Data
US 2013/0019140 A1     Jan. 17, 2013

Related U.S. Application Data

(60) Provisional application No. 61/282,713, filed on Mar. 22, 2010.

(51) Int. Cl.
H03M 13/09 (2006.01)
H03M 13/29 (2006.01)
H03M 13/00 (2006.01)
G06F 21/00 (2013.01)

(52) U.S. Cl.
CPC .......... *H03M 13/2906* (2013.01); *H03M 13/63* (2013.01); *G06F 21/00* (2013.01)
USPC ............................ 714/758; 714/766; 714/752

(58) Field of Classification Search
CPC ............................ H03M 13/09; H04L 1/0061
USPC ......... 714/758, 721, 766, 800, 752, 776, 781, 714/761, 774
See application file for complete search history.

(56) References Cited

U.S. PATENT DOCUMENTS

| | | |
|---|---|---|
| 2,512,038 A | 6/1950 | Potts |
| 2,552,629 A | 5/1951 | Hamming et al. |
| RE23,601 E | 12/1952 | Hamming et al. |
| 2,956,124 A | 10/1960 | Hagelbarger |
| 3,144,635 A | 8/1964 | Brown et al. |
| 3,248,695 A | 4/1966 | Dascotte |
| 3,508,194 A | 4/1970 | Brown |
| 3,551,886 A | 12/1970 | Cook |
| 3,629,824 A | 12/1971 | Bossen |
| 3,639,900 A | 2/1972 | Hinz, Jr. |
| 3,652,998 A | 3/1972 | Forney, Jr. |
| 3,786,439 A | 1/1974 | McDonald et al. |

(Continued)

OTHER PUBLICATIONS

The "Nash Algorithm" and correspondence between John Nash, Mass. Inst. of Tech., Mathematics Dept., and U.S. Gov't representatives, 1955.

(Continued)

*Primary Examiner* — Fritz Alphonse
(74) *Attorney, Agent, or Firm* — J. Charles Dougherty

(57) ABSTRACT

A method of identifying and protecting the integrity of a set of source data which produces and combines an identification signature with a detection and correction remainder and extends the existing capability of some information assurance methods.

28 Claims, 9 Drawing Sheets

(56) References Cited

U.S. PATENT DOCUMENTS

| | | |
|---|---|---|
| 3,931,504 A | 1/1976 | Jacoby |
| 4,030,067 A | 6/1977 | Howell et al. |
| 4,087,856 A | 5/1978 | Attanasio |
| 4,181,969 A | 1/1980 | Smith, Jr. |
| 4,213,188 A | 7/1980 | Smolko et al. |
| 4,442,486 A | 4/1984 | Mayer |
| 4,567,594 A | 1/1986 | Deodhar |
| 4,592,019 A | 5/1986 | Huang et al. |
| 4,633,470 A | 12/1986 | Welch et al. |
| 4,723,284 A | 2/1988 | Munck et al. |
| 4,752,904 A | 6/1988 | Paul |
| 4,757,534 A | 7/1988 | Matyas et al. |
| 4,777,595 A | 10/1988 | Strecker et al. |
| 4,809,274 A | 2/1989 | Walker et al. |
| 4,821,268 A | 4/1989 | Berlekamp |
| 4,833,678 A | 5/1989 | Cohen |
| 4,852,101 A | 7/1989 | Kobayashi et al. |
| 4,870,607 A | 9/1989 | Ishizuka |
| 4,899,303 A | 2/1990 | Kimura |
| 4,905,281 A | 2/1990 | Surjaatmadja et al. |
| 4,908,861 A | 3/1990 | Brachtl et al. |
| 4,918,653 A | 4/1990 | Johri et al. |
| 4,926,374 A | 5/1990 | Schaffer |
| 5,051,745 A | 9/1991 | Katz |
| 5,069,547 A | 12/1991 | Huggins et al. |
| 5,081,629 A | 1/1992 | Criswell et al. |
| 5,148,480 A | 9/1992 | Forsyth |
| RE34,088 E | 10/1992 | Tsang et al. |
| 5,224,160 A | 6/1993 | Paulini et al. |
| 5,249,294 A | 9/1993 | Griffin, III et al. |
| 5,359,721 A | 10/1994 | Kempf et al. |
| 5,361,359 A | 11/1994 | Tajalli et al. |
| 5,392,299 A | 2/1995 | Rhines et al. |
| 5,406,570 A | 4/1995 | Berrou et al. |
| 5,420,640 A | 5/1995 | Munich et al. |
| 5,446,747 A | 8/1995 | Berrou |
| 5,559,884 A | 9/1996 | Davidson et al. |
| 5,563,897 A | 10/1996 | Pyndiah et al. |
| 5,608,801 A | 3/1997 | Aiello et al. |
| 5,633,929 A | 5/1997 | Kaliski et al. |
| 5,673,316 A | 9/1997 | Auerbach et al. |
| 5,892,899 A | 4/1999 | Aucsmith et al. |
| 5,917,912 A | 6/1999 | Ginter et al. |
| 5,940,513 A | 8/1999 | Aucsmith et al. |
| 6,006,328 A | 12/1999 | Drake |
| 6,023,783 A | 2/2000 | Divsalar et al. |
| 6,044,468 A | 3/2000 | Osmond |
| 6,067,622 A | 5/2000 | Moore |
| 6,108,388 A | 8/2000 | Douillard et al. |
| 6,118,870 A | 9/2000 | Boyle et al. |
| 6,119,264 A | 9/2000 | Berrou et al. |
| 6,351,832 B1 | 2/2002 | Wei |
| 6,411,715 B1 | 6/2002 | Liskov et al. |
| 6,473,878 B1 | 10/2002 | Wei |
| 6,530,059 B1 | 3/2003 | Crozier et al. |
| 6,694,344 B1 | 2/2004 | Gerwig et al. |
| 6,714,931 B1 | 3/2004 | Papierniak et al. |
| 6,718,047 B2 | 4/2004 | Rhoads |
| 6,718,276 B2 | 4/2004 | Jungerman |
| 6,782,504 B1 | 8/2004 | Berrou et al. |
| 6,829,671 B1 | 12/2004 | Tran et al. |
| 6,842,862 B2 | 1/2005 | Chow et al. |
| 6,915,426 B1 | 7/2005 | Carman et al. |
| 6,941,463 B1 | 9/2005 | Atallah et al. |
| 6,957,341 B2 | 10/2005 | Rice et al. |
| 7,039,848 B2 | 5/2006 | Inokuchi et al. |
| 7,050,581 B1 | 5/2006 | Goubin et al. |
| 7,058,977 B1 | 6/2006 | Furukawa et al. |
| 7,069,246 B2 | 6/2006 | Stebbings |
| 7,096,499 B2 | 8/2006 | Munson |
| 7,140,037 B2 | 11/2006 | Tsutsui et al. |
| 7,149,801 B2 | 12/2006 | Burrows et al. |
| 7,155,015 B2 | 12/2006 | Katayama et al. |
| 7,158,954 B2 | 1/2007 | Schull |
| 7,165,173 B1 | 1/2007 | Herle |
| 7,185,367 B2 | 2/2007 | Munson |
| RE39,653 E | 5/2007 | Oshima et al. |
| 7,225,385 B2 | 5/2007 | Lin et al. |
| 7,237,123 B2 | 6/2007 | LeVine et al. |
| 7,249,305 B2 | 7/2007 | Kojima et al. |
| 7,251,327 B1 | 7/2007 | Sako et al. |
| 7,299,499 B2 | 11/2007 | Abe et al. |
| 7,313,825 B2 | 12/2007 | Redlich et al. |
| 7,321,666 B2 | 1/2008 | Kunisa |
| 7,325,183 B2 | 1/2008 | Deolalikar |
| 7,356,696 B1 | 4/2008 | Jakobsson et al. |
| 7,373,519 B1 | 5/2008 | Nachenberg et al. |
| 7,379,546 B2 | 5/2008 | Ibrahim |
| 7,389,466 B1 | 6/2008 | Harmer et al. |
| 7,401,228 B2 | 7/2008 | Sako et al. |
| 7,412,053 B1 | 8/2008 | Lyle |
| 7,412,057 B2 | 8/2008 | Dagan et al. |
| 7,437,759 B1 | 10/2008 | Szor |
| 7,437,761 B2 | 10/2008 | Takahashi |
| 7,437,762 B2 | 10/2008 | Dacier et al. |
| 7,440,434 B2 | 10/2008 | Chaskar et al. |
| 7,441,272 B2 | 10/2008 | Durham et al. |
| 7,441,275 B2 | 10/2008 | McCallam et al. |
| 7,444,511 B2 | 10/2008 | Morimoto |
| 7,444,677 B2 | 10/2008 | Marr |
| 7,444,678 B2 | 10/2008 | Whitmer et al. |
| 7,444,679 B2 | 10/2008 | Tarquini et al. |
| 7,448,083 B2 | 11/2008 | Kashiwada |
| 7,450,005 B2 | 11/2008 | Anand et al. |
| 7,451,485 B2 | 11/2008 | Watanabe et al. |
| 7,451,486 B2 | 11/2008 | Garg et al. |
| 7,454,628 B2 | 11/2008 | Sako et al. |
| 7,454,790 B2 | 11/2008 | Potok |
| 7,458,094 B2 | 11/2008 | Jackson |
| 7,458,095 B2 | 11/2008 | Forsberg |
| 7,458,098 B2 | 11/2008 | Judge et al. |
| 7,458,099 B1 | 11/2008 | Nachenberg et al. |
| 7,461,402 B1 | 12/2008 | Lyle et al. |
| 7,461,404 B2 | 12/2008 | Dudfield et al. |
| 7,463,590 B2 | 12/2008 | Mualem et al. |
| 7,464,158 B2 | 12/2008 | Albornoz |
| 7,464,274 B2 | 12/2008 | Goldshlag et al. |
| 7,464,398 B2 | 12/2008 | Robert et al. |
| 7,464,404 B2 | 12/2008 | Carpenter et al. |
| 7,464,410 B1 | 12/2008 | Halasz et al. |
| 7,467,400 B1 | 12/2008 | Moss et al. |
| 7,467,408 B1 | 12/2008 | O'Toole, Jr. |
| 7,467,410 B2 | 12/2008 | Graham et al. |
| 7,469,049 B1 | 12/2008 | Feng |
| 7,469,418 B1 | 12/2008 | Wilkinson et al. |
| 7,472,165 B2 | 12/2008 | Sawada |
| 7,472,416 B2 | 12/2008 | Ramaiah et al. |
| 7,472,417 B2 | 12/2008 | Gerlach et al. |
| 7,472,420 B1 | 12/2008 | Pavlyushchik |
| 7,472,421 B2 | 12/2008 | Cummins |
| 7,475,405 B2 | 1/2009 | Manganaris et al. |
| 7,475,425 B2 | 1/2009 | Bantz et al. |
| 7,475,426 B2 | 1/2009 | Copeland, III |
| 7,475,428 B2 | 1/2009 | Smith et al. |
| 7,478,250 B2 | 1/2009 | Armingaud et al. |
| 7,478,429 B2 | 1/2009 | Lyon |
| 7,478,430 B2 | 1/2009 | Lukkaroinen et al. |
| 7,483,972 B2 | 1/2009 | Bhattacharya et al. |
| 7,484,105 B2 | 1/2009 | Goodman et al. |
| 7,484,168 B2 | 1/2009 | Siegel et al. |
| 7,486,666 B2 | 2/2009 | Meyer |
| 7,487,149 B2 | 2/2009 | Wong |
| 7,487,542 B2 | 2/2009 | Boulanger et al. |
| 7,487,546 B1 | 2/2009 | Szor |
| 7,490,244 B1 | 2/2009 | Kennedy et al. |
| 7,490,352 B2 | 2/2009 | Kramer et al. |
| 7,490,354 B2 | 2/2009 | Garbow et al. |
| 7,490,356 B2 | 2/2009 | Lieblich et al. |
| 7,493,654 B2 | 2/2009 | Bantz et al. |
| 7,496,961 B2 | 2/2009 | Zimmer et al. |
| 7,496,962 B2 | 2/2009 | Roelker et al. |
| 7,496,965 B2 | 2/2009 | Sako et al. |
| RE40,687 E | 3/2009 | Oshima et al. |
| 7,500,265 B2 | 3/2009 | Encinas et al. |

(56) References Cited

U.S. PATENT DOCUMENTS

| | | |
|---|---|---|
| 7,500,266 B1 | 3/2009 | Vukelich et al. |
| 7,503,071 B1 | 3/2009 | Hernacki |
| 7,506,360 B1 | 3/2009 | Wilkinson et al. |
| 7,506,373 B2 | 3/2009 | Morin et al. |
| 7,509,250 B2 | 3/2009 | Cruzado et al. |
| 7,509,675 B2 | 3/2009 | Aaron |
| 7,509,676 B2 | 3/2009 | Trueba |
| 7,509,677 B2 | 3/2009 | Saurabh et al. |
| 7,509,678 B2 | 3/2009 | Pearson et al. |
| 7,509,681 B2 | 3/2009 | Flowers et al. |
| 7,512,969 B2 | 3/2009 | Gould et al. |
| 7,512,977 B2 | 3/2009 | Cook et al. |
| 7,512,979 B1 | 3/2009 | Koike et al. |
| 7,512,980 B2 | 3/2009 | Copeland et al. |
| 7,512,981 B2 | 3/2009 | Pearson |
| 7,516,487 B1 | 4/2009 | Szeto et al. |
| 7,516,488 B1 | 4/2009 | Kienzle et al. |
| 7,519,138 B2 | 4/2009 | Lee et al. |
| 7,519,834 B1 | 4/2009 | Dondeti et al. |
| 7,519,860 B2 | 4/2009 | Hatonen et al. |
| 7,519,987 B1 | 4/2009 | Holt et al. |
| 7,519,996 B2 | 4/2009 | Cain |
| 7,519,998 B2 | 4/2009 | Cai et al. |
| 7,522,908 B2 | 4/2009 | Hrastar |
| 7,523,494 B2 | 4/2009 | Himberger et al. |
| 7,523,499 B2 | 4/2009 | Wilkins et al. |
| 7,523,500 B1 | 4/2009 | Szor et al. |
| 7,523,501 B2 | 4/2009 | Liang |
| 7,523,502 B1 | 4/2009 | Kennedy et al. |
| 7,523,503 B2 | 4/2009 | Mendonca et al. |
| 7,523,504 B2 | 4/2009 | Shah |
| 7,526,658 B1 | 4/2009 | He et al. |
| 7,526,707 B2 | 4/2009 | Stroud et al. |
| 7,526,804 B2 | 4/2009 | Shelest et al. |
| 7,526,806 B2 | 4/2009 | Wiley et al. |
| 7,526,807 B2 | 4/2009 | Chao et al. |
| 7,526,808 B2 | 4/2009 | Lynn et al. |
| 7,526,809 B2 | 4/2009 | Liang et al. |
| 7,529,187 B1 | 5/2009 | Hernacki et al. |
| 7,529,242 B1 | 5/2009 | Lyle |
| 7,530,106 B1 | 5/2009 | Zaitsev et al. |
| 7,532,895 B2 | 5/2009 | Hrastar |
| 7,533,413 B2 | 5/2009 | Samuelsson et al. |
| 7,533,415 B2 | 5/2009 | Chen et al. |
| 7,536,452 B1 | 5/2009 | Cao et al. |
| 7,536,723 B1 | 5/2009 | Bhagwat et al. |
| 7,539,312 B2 | 5/2009 | Fujiwara et al. |
| 7,540,028 B2 | 5/2009 | Ahmed et al. |
| 7,540,029 B1 | 5/2009 | Saxena |
| 7,540,030 B1 | 5/2009 | Zaitsev |
| 7,543,333 B2 | 6/2009 | Pandit et al. |
| 7,546,468 B2 | 6/2009 | Fujiwara et al. |
| 7,546,471 B2 | 6/2009 | Phillips et al. |
| 7,546,637 B1 | 6/2009 | Agbabian et al. |
| 7,546,639 B2 | 6/2009 | Bantz et al. |
| 7,549,093 B2 | 6/2009 | Heise |
| 7,549,162 B2 | 6/2009 | Aaron |
| 7,549,164 B2 | 6/2009 | Cook et al. |
| 7,549,166 B2 | 6/2009 | Baffes et al. |
| 7,549,167 B1 | 6/2009 | Huang et al. |
| 7,551,073 B2 | 6/2009 | Gavin |
| 7,551,615 B2 | 6/2009 | Trumper et al. |
| 7,551,633 B1 | 6/2009 | MacBride |
| 7,552,196 B2 | 6/2009 | Levi et al. |
| 7,552,377 B1 | 6/2009 | Jones |
| 7,552,478 B2 | 6/2009 | Seki et al. |
| 7,554,444 B2 | 6/2009 | Rao |
| 7,555,684 B1 | 6/2009 | Mazahreh |
| 7,555,777 B2 | 6/2009 | Swimmer et al. |
| 7,555,778 B2 | 6/2009 | Noel et al. |
| 7,558,796 B1 | 7/2009 | Bromwich et al. |
| 7,559,086 B2 | 7/2009 | Sobko et al. |
| 7,562,214 B2 | 7/2009 | Riordan |
| 7,562,388 B2 | 7/2009 | Hackenberger et al. |
| 7,562,390 B1 | 7/2009 | Kwan |
| 7,562,391 B1 | 7/2009 | Nachenberg et al. |
| 7,565,686 B1 | 7/2009 | Sobel et al. |
| 7,565,692 B1 | 7/2009 | Maria |
| 7,565,693 B2 | 7/2009 | Shin et al. |
| 7,565,695 B2 | 7/2009 | Burtscher |
| 7,565,696 B1 | 7/2009 | Njemanze |
| 7,568,228 B2 | 7/2009 | Dominique et al. |
| 7,568,229 B1 | 7/2009 | Nachenberg et al. |
| 7,568,230 B2 | 7/2009 | Lieberman et al. |
| 7,568,232 B2 | 7/2009 | Mitomo et al. |
| 7,568,233 B1 | 7/2009 | Szor et al. |
| 7,570,697 B2 | 8/2009 | van Nee |
| 7,571,319 B2 | 8/2009 | Gillum et al. |
| 7,571,477 B2 | 8/2009 | Oh et al. |
| 7,571,478 B2 | 8/2009 | Munson et al. |
| 7,571,479 B2 | 8/2009 | Eastlake, III |
| 7,571,480 B2 | 8/2009 | Black et al. |
| 7,571,482 B2 | 8/2009 | Polyakov et al. |
| 7,574,740 B1 | 8/2009 | Kennis |
| 7,574,741 B2 | 8/2009 | Aviani et al. |
| 7,574,743 B2 | 8/2009 | Masuzawa et al. |
| 7,577,881 B1 | 8/2009 | Shridhar et al. |
| 7,577,998 B1 | 8/2009 | Crosbie et al. |
| 7,581,249 B2 | 8/2009 | Bussiere et al. |
| 7,581,250 B2 | 8/2009 | Sitze |
| 7,584,507 B1 | 9/2009 | Nucci |
| 7,584,509 B2 | 9/2009 | Wu et al. |
| 7,586,993 B2 | 9/2009 | Rastello et al. |
| 7,587,645 B2 | 9/2009 | Chang et al. |
| 7,587,724 B2 | 9/2009 | Yeap |
| 7,587,761 B2 | 9/2009 | Duffield et al. |
| 7,587,762 B2 | 9/2009 | Singhal et al. |
| 7,587,763 B2 | 9/2009 | Yodaiken |
| 7,587,764 B2 | 9/2009 | Cox |
| 7,587,765 B2 | 9/2009 | Challener et al. |
| 7,590,113 B1 | 9/2009 | Boxmeyer et al. |
| 7,590,813 B1 | 9/2009 | Szor |
| 7,590,834 B2 | 9/2009 | Challener et al. |
| 7,590,870 B2 | 9/2009 | Catherman et al. |
| 7,590,880 B1 | 9/2009 | Hershman |
| 7,591,004 B2 | 9/2009 | Roskind |
| 7,591,016 B2 | 9/2009 | Horne |
| 7,594,014 B2 | 9/2009 | Nakamura |
| 7,594,263 B2 | 9/2009 | Boulanger et al. |
| 7,594,266 B2 | 9/2009 | Mattsson et al. |
| 7,594,267 B2 | 9/2009 | Gladstone et al. |
| 7,594,268 B1 | 9/2009 | Sobel |
| 7,594,269 B2 | 9/2009 | Durham et al. |
| 7,594,270 B2 | 9/2009 | Church et al. |
| 7,594,272 B1 | 9/2009 | Kennedy et al. |
| 7,594,273 B2 | 9/2009 | Keanini et al. |
| 7,596,227 B2 | 9/2009 | Illowsky et al. |
| 7,596,807 B2 | 9/2009 | Ptacek et al. |
| 7,596,808 B1 | 9/2009 | Wilkinson et al. |
| 7,599,289 B2 | 10/2009 | Caci |
| 7,600,164 B2 | 10/2009 | Chen |
| 7,600,252 B2 | 10/2009 | Illosky et al. |
| 7,600,255 B1 | 10/2009 | Baugher |
| 7,600,257 B2 | 10/2009 | Dubrovsky et al. |
| 7,600,259 B2 | 10/2009 | Qi |
| 7,603,461 B2 | 10/2009 | Crosby et al. |
| 7,603,614 B2 | 10/2009 | Cohen et al. |
| 7,603,704 B2 | 10/2009 | Bruening et al. |
| 7,603,709 B2 | 10/2009 | Lewis et al. |
| 7,603,710 B2 | 10/2009 | Harvey et al. |
| 7,603,716 B2 | 10/2009 | Frank et al. |
| 7,606,225 B2 | 10/2009 | Xie et al. |
| 7,607,010 B2 | 10/2009 | Cavanaugh |
| 7,607,169 B1 | 10/2009 | Njemanze et al. |
| 7,607,170 B2 | 10/2009 | Chesla |
| 7,607,173 B1 | 10/2009 | Szor et al. |
| 7,607,174 B1 | 10/2009 | Kashchenko et al. |
| 7,609,839 B2 | 10/2009 | Watanabe et al. |
| 7,610,519 B1 | 10/2009 | Graham et al. |
| 7,610,623 B2 | 10/2009 | Sinha et al. |
| 7,610,624 B1 | 10/2009 | Brothers et al. |
| RE40,969 E | 11/2009 | Oshima et al. |
| 7,613,179 B2 | 11/2009 | Soukup |
| 7,614,083 B2 | 11/2009 | Khuti et al. |

(56) References Cited

U.S. PATENT DOCUMENTS

| | | |
|---|---|---|
| 7,614,084 B2 | 11/2009 | Monastyrsky et al. |
| 7,614,085 B2 | 11/2009 | Ben-Itzhak |
| 7,617,526 B2 | 11/2009 | Davis et al. |
| 7,617,533 B1 | 11/2009 | Hernacki |
| 7,617,534 B1 | 11/2009 | Szor et al. |
| 7,617,537 B2 | 11/2009 | Morohashi |
| 7,620,988 B1 | 11/2009 | Hernacki |
| 7,620,989 B1 | 11/2009 | Couturier et al. |
| 7,620,992 B2 | 11/2009 | Monastyrsky et al. |
| 7,624,326 B2 | 11/2009 | Watanabe et al. |
| 7,624,373 B2 | 11/2009 | Pandit et al. |
| 7,624,444 B2 | 11/2009 | Gupta et al. |
| 7,624,445 B2 | 11/2009 | Gupta et al. |
| 7,624,446 B1 | 11/2009 | Wilhelm |
| 7,624,447 B1 | 11/2009 | Horowitz et al. |
| 7,624,448 B2 | 11/2009 | Coffman |
| 7,624,449 B1 | 11/2009 | Perriot |
| RE41,032 E | 12/2009 | Oshima et al. |
| 7,627,576 B2 | 12/2009 | Ra et al. |
| 7,627,897 B2 | 12/2009 | Peled et al. |
| 7,627,898 B2 | 12/2009 | Beck et al. |
| 7,627,900 B1 | 12/2009 | Noel et al. |
| 7,630,406 B2 | 12/2009 | Sood et al. |
| 7,631,349 B2 | 12/2009 | Schwartz |
| 7,631,351 B2 | 12/2009 | Erofeev |
| 7,631,355 B2 | 12/2009 | Bolt et al. |
| 7,634,655 B2 | 12/2009 | Kaniyar et al. |
| 7,634,800 B2 | 12/2009 | Ide et al. |
| 7,636,856 B2 | 12/2009 | Gheorghescu et al. |
| 7,636,940 B2 | 12/2009 | Yim |
| 7,636,942 B2 | 12/2009 | Hamada et al. |
| 7,636,943 B2 | 12/2009 | Gruper et al. |
| 7,636,944 B2 | 12/2009 | Raikar |
| 7,640,585 B2 | 12/2009 | Lee et al. |
| 7,640,590 B1 | 12/2009 | McCorkendale et al. |
| 7,640,591 B1 | 12/2009 | Tripathi et al. |
| 7,640,595 B2 | 12/2009 | Chojnacki |
| 7,644,151 B2 | 1/2010 | Jerrim et al. |
| 7,644,271 B1 | 1/2010 | Cherepov et al. |
| 7,644,438 B1 | 1/2010 | Dash et al. |
| 7,644,439 B2 | 1/2010 | Trostle |
| 7,644,440 B2 | 1/2010 | Sinha et al. |
| 7,647,308 B2 | 1/2010 | Sallam |
| 7,647,402 B2 | 1/2010 | McBrearty et al. |
| 7,647,430 B2 | 1/2010 | Ng et al. |
| 7,647,623 B2 | 1/2010 | Robert et al. |
| 7,647,635 B2 | 1/2010 | Chen et al. |
| 7,647,636 B2 | 1/2010 | Polyakov et al. |
| 7,647,637 B2 | 1/2010 | Schuba et al. |
| 7,650,638 B1 | 1/2010 | Njemanze et al. |
| 7,650,639 B2 | 1/2010 | Kramer et al. |
| 7,650,640 B1 | 1/2010 | Levy |
| 7,653,942 B2 | 1/2010 | Tamura et al. |
| 7,657,754 B2 | 2/2010 | Chambers et al. |
| 7,657,838 B2 | 2/2010 | Daniell et al. |
| 7,657,935 B2 | 2/2010 | Stolfo et al. |
| 7,657,937 B1 | 2/2010 | Kumar |
| 7,657,938 B2 | 2/2010 | Palmer, Jr. et al. |
| 7,657,939 B2 | 2/2010 | Strauss et al. |
| 7,657,940 B2 | 2/2010 | Portolani et al. |
| 7,660,707 B2 | 2/2010 | Maruyama et al. |
| 7,661,137 B2 | 2/2010 | Gerard |
| 7,661,138 B1 | 2/2010 | Li |
| 7,661,139 B2 | 2/2010 | Dequevy |
| 7,663,479 B1 | 2/2010 | Bajpay et al. |
| 7,664,855 B1 | 2/2010 | Freed et al. |
| 7,665,123 B1 | 2/2010 | Szor et al. |
| 7,665,134 B1 | 2/2010 | Hernacki et al. |
| 7,665,135 B1 | 2/2010 | Mohiuddin et al. |
| 7,665,136 B1 | 2/2010 | Szor |
| 7,665,138 B2 | 2/2010 | Song et al. |
| 7,665,139 B1 | 2/2010 | Szor et al. |
| 7,668,097 B2 | 2/2010 | Gross |
| 7,669,050 B2 | 2/2010 | Blinick et al. |
| 7,669,059 B2 | 2/2010 | Brent |
| 7,669,239 B2 | 2/2010 | Dickelman et al. |
| 7,669,243 B2 | 2/2010 | Conti |
| 7,672,453 B1 | 3/2010 | Matolak |
| 7,673,049 B2 | 3/2010 | Dinello et al. |
| 7,673,137 B2 | 3/2010 | Satterlee et al. |
| 7,673,138 B2 | 3/2010 | Hosokawa et al. |
| 7,673,150 B2 | 3/2010 | Cox et al. |
| 7,673,298 B2 | 3/2010 | Oyama |
| 7,673,341 B2 | 3/2010 | Kramer et al. |
| 7,673,342 B2 | 3/2010 | Hursey et al. |
| 7,676,217 B2 | 3/2010 | Zhu et al. |
| 7,676,673 B2 | 3/2010 | Weller et al. |
| 7,676,841 B2 | 3/2010 | Sobchuk et al. |
| 7,681,034 B1 | 3/2010 | Lee et al. |
| 7,681,049 B2 | 3/2010 | Wakao |
| 7,681,092 B2 | 3/2010 | Kowalski |
| 7,681,096 B2 | 3/2010 | Sasaki et al. |
| 7,681,235 B2 | 3/2010 | Chesla et al. |
| 7,681,236 B2 | 3/2010 | Tamura et al. |
| 7,681,237 B1 | 3/2010 | Spiegel et al. |
| 7,681,244 B2 | 3/2010 | Morioka et al. |
| 7,681,246 B1 | 3/2010 | Chen |
| 7,685,149 B2 | 3/2010 | Butcher et al. |
| 7,685,327 B1 | 3/2010 | Jacobson et al. |
| 7,685,417 B2 | 3/2010 | Wise et al. |
| 7,685,418 B1 | 3/2010 | Knight |
| 7,685,425 B1 | 3/2010 | Wright et al. |
| 7,685,632 B2 | 3/2010 | Vayman |
| 7,685,638 B1 | 3/2010 | Buches |
| 7,685,640 B2 | 3/2010 | Azadet et al. |
| 7,685,647 B2 | 3/2010 | Kitani |
| 7,689,827 B2 | 3/2010 | Sibert |
| 7,689,835 B2 | 3/2010 | Palliyil et al. |
| 7,690,034 B1 | 3/2010 | Sallam |
| 7,690,035 B2 | 3/2010 | Sasage et al. |
| 7,690,037 B1 | 3/2010 | Hartmann |
| 7,690,039 B2 | 3/2010 | Schmeidler et al. |
| 7,690,045 B2 | 3/2010 | Ferguson |
| 7,694,115 B1 | 4/2010 | Porras et al. |
| 7,694,133 B2 | 4/2010 | Sibert |
| 7,694,335 B1 | 4/2010 | Turner et al. |
| 7,694,338 B1 | 4/2010 | Jafari et al. |
| 7,694,339 B2 | 4/2010 | Blake et al. |
| 7,694,340 B2 | 4/2010 | Raman et al. |
| 7,694,343 B2 | 4/2010 | Sobel et al. |
| 7,697,685 B1 | 4/2010 | Feng |
| 7,698,552 B2 | 4/2010 | Wilson et al. |
| 7,698,620 B2 | 4/2010 | Ishida |
| 7,698,730 B2 | 4/2010 | Nazzal |
| 7,698,737 B2 | 4/2010 | Schwan et al. |
| 7,698,741 B2 | 4/2010 | Marinescu et al. |
| 7,701,945 B2 | 4/2010 | Roesch et al. |
| 7,702,906 B1 | 4/2010 | Karr et al. |
| 7,702,920 B2 | 4/2010 | Okamoto |
| 7,702,968 B2 | 4/2010 | Pan et al. |
| 7,702,969 B2 | 4/2010 | Dinoi et al. |
| 7,702,970 B2 | 4/2010 | Ha et al. |
| 7,703,133 B1 | 4/2010 | Balasubramanian et al. |
| 7,703,137 B2 | 4/2010 | Durham |
| 7,703,138 B2 | 4/2010 | Desai et al. |
| 7,707,411 B2 | 4/2010 | Bade et al. |
| 7,707,429 B2 | 4/2010 | Jin et al. |
| 7,707,629 B2 | 4/2010 | Grawrock |
| 7,707,631 B2 | 4/2010 | Bruecklmayr et al. |
| 7,707,632 B2 | 4/2010 | Nath et al. |
| 7,707,633 B2 | 4/2010 | Danford et al. |
| 7,707,634 B2 | 4/2010 | Sandu et al. |
| 7,707,635 B1 | 4/2010 | Kuo et al. |
| 7,707,637 B2 | 4/2010 | Kaler et al. |
| 7,707,639 B2 | 4/2010 | Brown et al. |
| 7,707,640 B2 | 4/2010 | Shavit et al. |
| 7,707,641 B2 | 4/2010 | Schmeidler et al. |
| 7,707,644 B2 | 4/2010 | Choi et al. |
| 7,711,948 B2 | 5/2010 | Yang et al. |
| 7,711,953 B2 | 5/2010 | Ali et al. |
| 7,711,962 B2 | 5/2010 | Kato |
| 7,712,077 B2 | 5/2010 | Carusi et al. |
| 7,712,132 B1 | 5/2010 | Ogilvie |
| 7,712,133 B2 | 5/2010 | Raikar et al. |

(56) References Cited

U.S. PATENT DOCUMENTS

| | | | |
|---|---|---|---|
| 7,712,134 B1 | 5/2010 | Nucci et al. |
| 7,712,138 B2 | 5/2010 | Zobel et al. |
| 7,712,140 B2 | 5/2010 | Hamlin |
| 7,716,470 B2 | 5/2010 | Stillerman et al. |
| 7,716,473 B1 | 5/2010 | Kraemer et al. |
| 7,716,485 B2 | 5/2010 | Howard et al. |
| 7,716,494 B2 | 5/2010 | Liu et al. |
| 7,716,495 B2 | 5/2010 | Shupak et al. |
| 7,716,563 B2 | 5/2010 | Deczky |
| 7,716,736 B2 | 5/2010 | Radatti et al. |
| 7,716,738 B2 | 5/2010 | Pietilainen et al. |
| 7,716,739 B1 | 5/2010 | McCorkendale |
| 7,716,740 B2 | 5/2010 | Robert et al. |
| 7,716,741 B2 | 5/2010 | Forman et al. |
| 7,720,764 B2 | 5/2010 | Emerson et al. |
| 7,720,945 B2 | 5/2010 | Iszlai et al. |
| 7,721,090 B1 | 5/2010 | Deepak et al. |
| 7,721,094 B2 | 5/2010 | Roberts et al. |
| 7,721,108 B2 | 5/2010 | Pailles et al. |
| 7,721,110 B2 | 5/2010 | Kouznetsov et al. |
| 7,721,114 B2 | 5/2010 | Yamaguchi et al. |
| 7,721,331 B1 | 5/2010 | Rowe |
| 7,721,333 B2 | 5/2010 | Horne |
| 7,721,336 B1 | 5/2010 | Adjaoute |
| 7,721,339 B2 | 5/2010 | Madison et al. |
| 7,724,907 B2 | 5/2010 | Candelore et al. |
| 7,725,713 B2 | 5/2010 | Wilson et al. |
| 7,725,724 B2 | 5/2010 | Ding et al. |
| 7,725,734 B2 | 5/2010 | Bumiller et al. |
| 7,725,735 B2 | 5/2010 | Fox et al. |
| 7,725,936 B2 | 5/2010 | Banerjee et al. |
| 7,725,937 B1 | 5/2010 | Levy |
| 7,725,938 B2 | 5/2010 | Cothrell et al. |
| 7,725,939 B2 | 5/2010 | Ishikawa |
| 7,725,941 B1 | 5/2010 | Pavlyushchik |
| 7,725,946 B2 | 5/2010 | Ogushi |
| 7,730,175 B1 | 6/2010 | Roesch et al. |
| 7,730,299 B2 | 6/2010 | Boebert et al. |
| 7,730,303 B2 | 6/2010 | Kamperman et al. |
| 7,730,325 B2 | 6/2010 | Morrow et al. |
| 7,730,522 B2 | 6/2010 | Bernabeu-Aubon et al. |
| 7,730,531 B2 | 6/2010 | Walsh |
| 7,730,535 B1 | 6/2010 | Kaspersky et al. |
| 7,730,536 B2 | 6/2010 | Pasko |
| 7,730,537 B2 | 6/2010 | Bardsley et al. |
| 7,730,538 B2 | 6/2010 | Fries et al. |
| 7,734,048 B2 | 6/2010 | Crandall |
| 7,734,776 B2 | 6/2010 | Boulanger et al. |
| 7,734,915 B2 | 6/2010 | Neill et al. |
| 7,734,931 B2 | 6/2010 | Carter et al. |
| 7,734,933 B1 | 6/2010 | Marek et al. |
| 7,734,934 B2 | 6/2010 | Zimmer et al. |
| 7,735,128 B2 | 6/2010 | Kim et al. |
| 7,735,137 B2 | 6/2010 | Baik et al. |
| 7,735,138 B2 | 6/2010 | Zhao |
| 7,735,141 B1 | 6/2010 | Noel et al. |
| 7,739,100 B1 | 6/2010 | Muttik et al. |
| 7,739,211 B2 | 6/2010 | Coffman et al. |
| 7,739,341 B1 | 6/2010 | Sobel |
| 7,739,495 B2 | 6/2010 | Asano et al. |
| 7,739,498 B2 | 6/2010 | Barnes et al. |
| 7,739,514 B2 | 6/2010 | Bangui |
| 7,739,516 B2 | 6/2010 | Brender et al. |
| 7,739,563 B2 | 6/2010 | Ichikawa |
| 7,739,734 B2 | 6/2010 | Huang |
| 7,739,737 B2 | 6/2010 | Christodorescu et al. |
| 7,739,738 B1 | 6/2010 | Sobel et al. |
| 7,739,739 B2 | 6/2010 | Dettinger et al. |
| 7,739,740 B1 | 6/2010 | Nachenberg et al. |
| 7,739,742 B2 | 6/2010 | Poizner et al. |
| 7,739,745 B2 | 6/2010 | Ishimatsu et al. |
| 7,739,746 B2 | 6/2010 | Donahue |
| 7,742,409 B2 | 6/2010 | Wang et al. |
| 7,743,153 B2 | 6/2010 | Hall et al. |
| 7,743,239 B2 | 6/2010 | Ahlquist |
| 7,743,250 B2 | 6/2010 | Champion |
| 7,743,257 B2 | 6/2010 | Rabeler |
| 7,743,287 B2 | 6/2010 | Dimou |
| 7,743,404 B1 | 6/2010 | Deutschmann et al. |
| 7,743,407 B2 | 6/2010 | Sprigg et al. |
| 7,743,413 B2 | 6/2010 | Ohta et al. |
| 7,743,415 B2 | 6/2010 | Poletto et al. |
| 7,743,418 B2 | 6/2010 | Clift et al. |
| 7,743,419 B1 | 6/2010 | Mashevsky et al. |
| 7,743,424 B2 | 6/2010 | Lu et al. |
| 7,743,426 B2 | 6/2010 | Nakagawa |
| 7,747,012 B2 | 6/2010 | Akkar |
| 7,747,017 B2 | 6/2010 | Valentine et al. |
| 7,747,024 B2 | 6/2010 | Challener |
| 7,747,597 B2 | 6/2010 | Dutta et al. |
| 7,747,688 B2 | 6/2010 | Narayanaswami et al. |
| 7,747,853 B2 | 6/2010 | Candelore |
| 7,747,875 B2 | 6/2010 | Cookson et al. |
| 7,747,877 B2 | 6/2010 | Jin et al. |
| 7,747,924 B2 | 6/2010 | Doyle |
| 7,748,030 B1 | 6/2010 | Selberg et al. |
| 7,748,034 B2 | 6/2010 | Fluhrer et al. |
| 7,748,035 B2 | 6/2010 | Nedeltchev et al. |
| 7,748,037 B2 | 6/2010 | Rajagopal et al. |
| 7,748,043 B2 | 6/2010 | Knechtel et al. |
| 7,748,045 B2 | 6/2010 | Kenrich et al. |
| 7,748,046 B2 | 6/2010 | Johnson et al. |
| 7,748,047 B2 | 6/2010 | O'Neill |
| 7,748,050 B2 | 6/2010 | Otsuka et al. |
| 7,752,465 B2 | 7/2010 | Ebringer et al. |
| 7,752,664 B1 | 7/2010 | Satish et al. |
| 7,752,665 B1 | 7/2010 | Robertson et al. |
| 7,752,666 B2 | 7/2010 | Jayawardena et al. |
| 7,752,667 B2 | 7/2010 | Challener et al. |
| 7,752,671 B2 | 7/2010 | Kotler et al. |
| 7,757,086 B2 | 7/2010 | Walmsley |
| 7,757,091 B2 | 7/2010 | Duffell et al. |
| 7,757,097 B2 | 7/2010 | Atallah et al. |
| 7,757,098 B2 | 7/2010 | Brannock et al. |
| 7,757,288 B1 | 7/2010 | Khalsa |
| 7,757,289 B2 | 7/2010 | Gruzman et al. |
| 7,757,290 B2 | 7/2010 | Costea et al. |
| 7,757,291 B2 | 7/2010 | Rochette et al. |
| 7,757,292 B1 | 7/2010 | Renert et al. |
| 7,779,394 B2 | 8/2010 | Homing et al. |
| 7,784,097 B1 | 8/2010 | Stolfo et al. |
| 7,945,825 B2 * | 5/2011 | Cohen et al. ............ 714/721 |
| 8,120,960 B2 * | 2/2012 | Varkony ............ 365/185.16 |
| 2004/0078747 A1 | 4/2004 | Miller et al. |
| 2006/0101047 A1 | 5/2006 | Rice |
| 2007/0050695 A1 | 3/2007 | Schulz |
| 2007/0127721 A1 | 6/2007 | Atallah et al. |
| 2007/0174614 A1 | 7/2007 | Duane et al. |
| 2007/0192864 A1 | 8/2007 | Bryant et al. |
| 2007/0198888 A1 | 8/2007 | Zhang |

OTHER PUBLICATIONS

Kiayias, A. et al., Cryptography and Decoding Reed-Solomon Codes as a Hard Problem, IEEE, 0-7803-9491-7/05, 2005, 1 page.

Bellare, M. et al., Keying Hash Functions for Message Authentication, expanded from version published in Advances in Cryptography-Crypto 96 Proceedings, Jun. 1996, pp. 1-19.

Berrou, C. et al., Near Optimum Error Correcting Codes and Decoding: Turbo Codes, IEEE Transactions on Communications, vol. 44, No. 10, 0090-6778/96, Oct. 1996, pp. 1261-1271.

Shamir, A. Factoring Large Numbers with the TWINKLE Device, Weizmann Institute of Science, Cryptographic Hardware and Embedded Systems Lecture Notes, vol. 1717, 1999, pp. 1-12.

Rogers, C., A New Program for Computing P-Linear System Cardinality that Determines the Group of Weil Divisors of a Zariski Surface, University of Kansas, 1995.

IEEE Std. 802.3-2005, Part 3: Carrier Sense Multiple Access Method and Physical Physical Layer Specifications, Dec. 9, 2005, p. 52.

Rogers, C., Choosing a CRC & Specifying Its Requirments for Field-Loadable Software, IEEE 27th Digital Avionics Conference, Oct. 26-30, 2008, pp. 5.C.6-1-5.C.6-9.

(56) References Cited

OTHER PUBLICATIONS

Rogers, C, Handout and Slides, Choosing a CRC & Specifying Its Requirments for Field-Loadable Software, IEEE 27th Digital Avionics Conference, Oct. 26-30, 2008, 5 pages.

Hammond, J. et al., Development of a Transmission Model and an Error Control Model, Technical Report RADC-TR-138, Rome: Air Development Center, May 1975.

Shannon, C., A Mathematical Theory of Communications, The Bell System Technical Journal, vol. 27, July Oct. 1948, pp. 379-423, 623-656.

Shannon, C., Communication Theory of Secrecy Systems, the material in this paper appeared in a confidential report "A Mathematic Theory of Cryptography," Sep. 1, 1946.

Maxwell, B. et al., Analysis of CRC Methods and Potential Data Integrity Exploits, Proceedings of the International Conference on Emerging Technologies, Aug. 25-26, 2003.

Thompson, D. et al., Building the Big Message Authentication Code, Proccedings 8th World Multiconference on SCI, vol. 2, Jul. 18-24, 2004, pp. 554-549.

Peterson, W., Error-correcting Codes, Scientific American, vol. 206, No. 2, Feb. 1962, pp. 96-108.

Lin, S. et al., Error Control Coding: Fundamental and Applications, Prentice-Hall, Inc., Englewood Cliffs, New Jersey, 1983, pp. 278-280.

Rogers, C., A Market Solution to Improve Software Integrity, Safety and Security through Voluntary Registration, presentation to Innovate Arkansas, Jun. 15, 2010, 1 page.

Rogers, C., An Investigation into EDC Techniques to Improve Integrity, Safety and Security, presentation of Office of Senator Mark Pryor, Dec. 8, 2009, 1 page.

Rogers, C., Proposing Improvements to Avoid the CRC Compromise, IEEE 28th Digital Avionics Systems Conference, Oct. 25-29, 2009, pp. 6.B.4-1-6.B.4-10.

Rogers, C., Speaker Notes, Proposing Improvements to Avoid the CRC Compromise, IEEE 28th Digital Avionics Systems Conference, Oct. 25-29, 2009, 11 pages.

Rogers, C., Slides, Proposing Improvements to Avoid the CRC Compromise, IEEE 28th Digital Avionics Systems Conference, Oct. 25-29, 2009, 16 pages.

Rogers, C., Handout, Proposing Improvements to Avoid the CRC Compromise, IEEE 28th Digital Avionics Systems Conference, Oct. 25-29, 2009, 6 pages.

http://en.wikipedia.org/wiki/Turbo-code, Turbo Code, printed from website May 15, 2012, 7 pages.

http://www.nsrl.nist.gov/, National Software Reference Library, printed from website May 15, 2012, 1 page.

International Search Report and Written Opinion of International Searching Authority, PCT/US2012/002682, Mailing Date Dec. 9, 2010, 10 pages.

\* cited by examiner

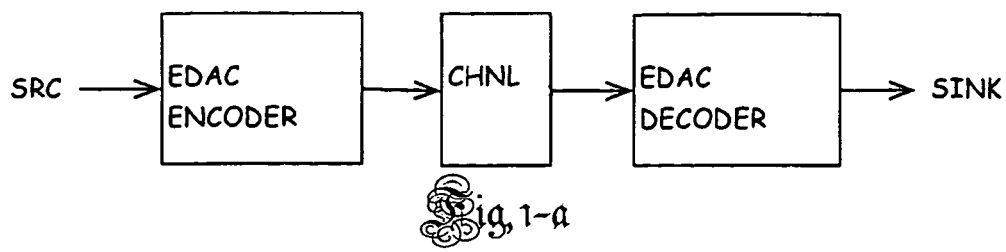
Fig. 1-a
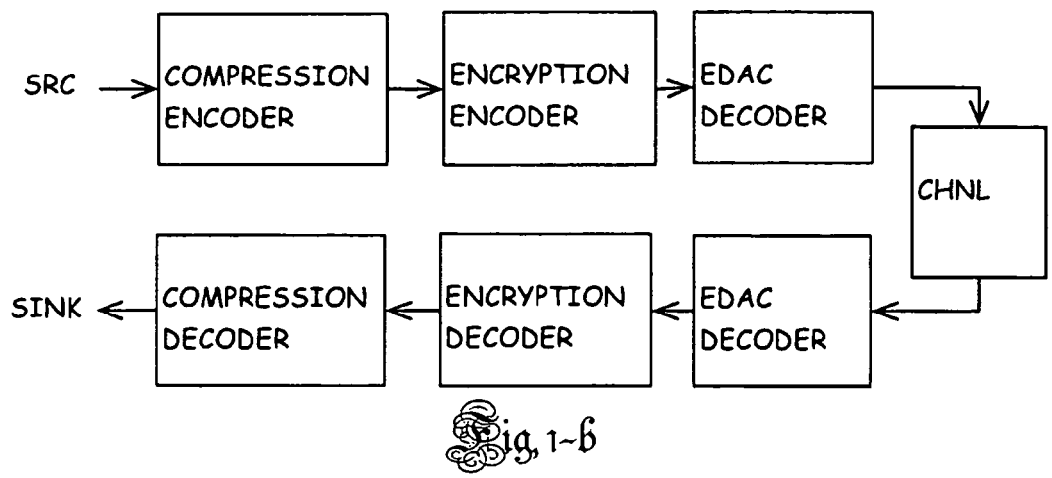
Fig. 1-b
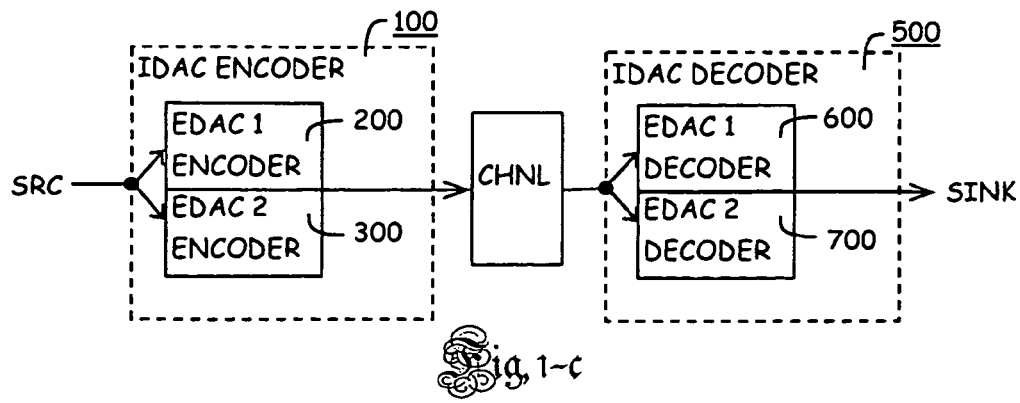
Fig. 1-c

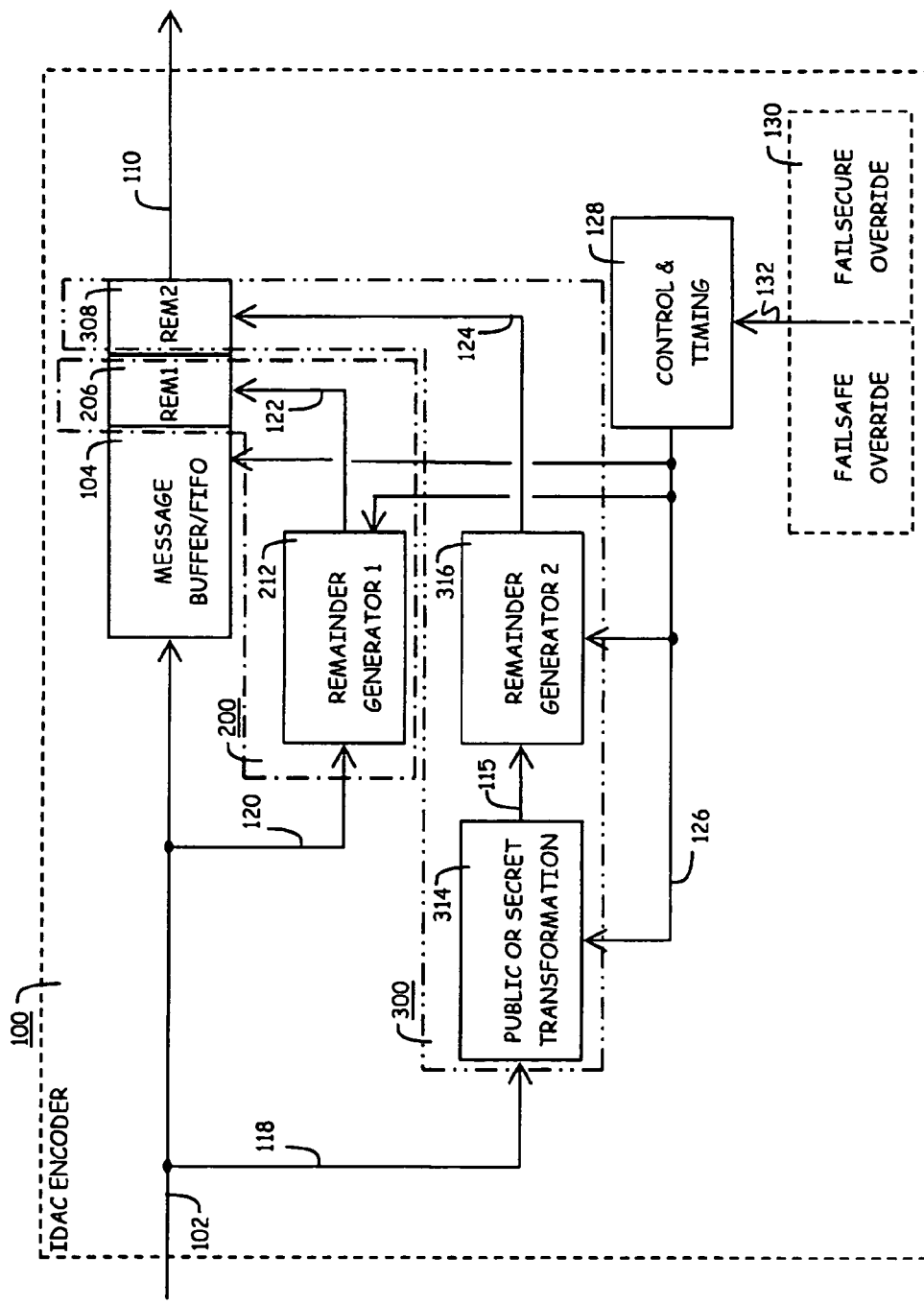
Fig. 1-b

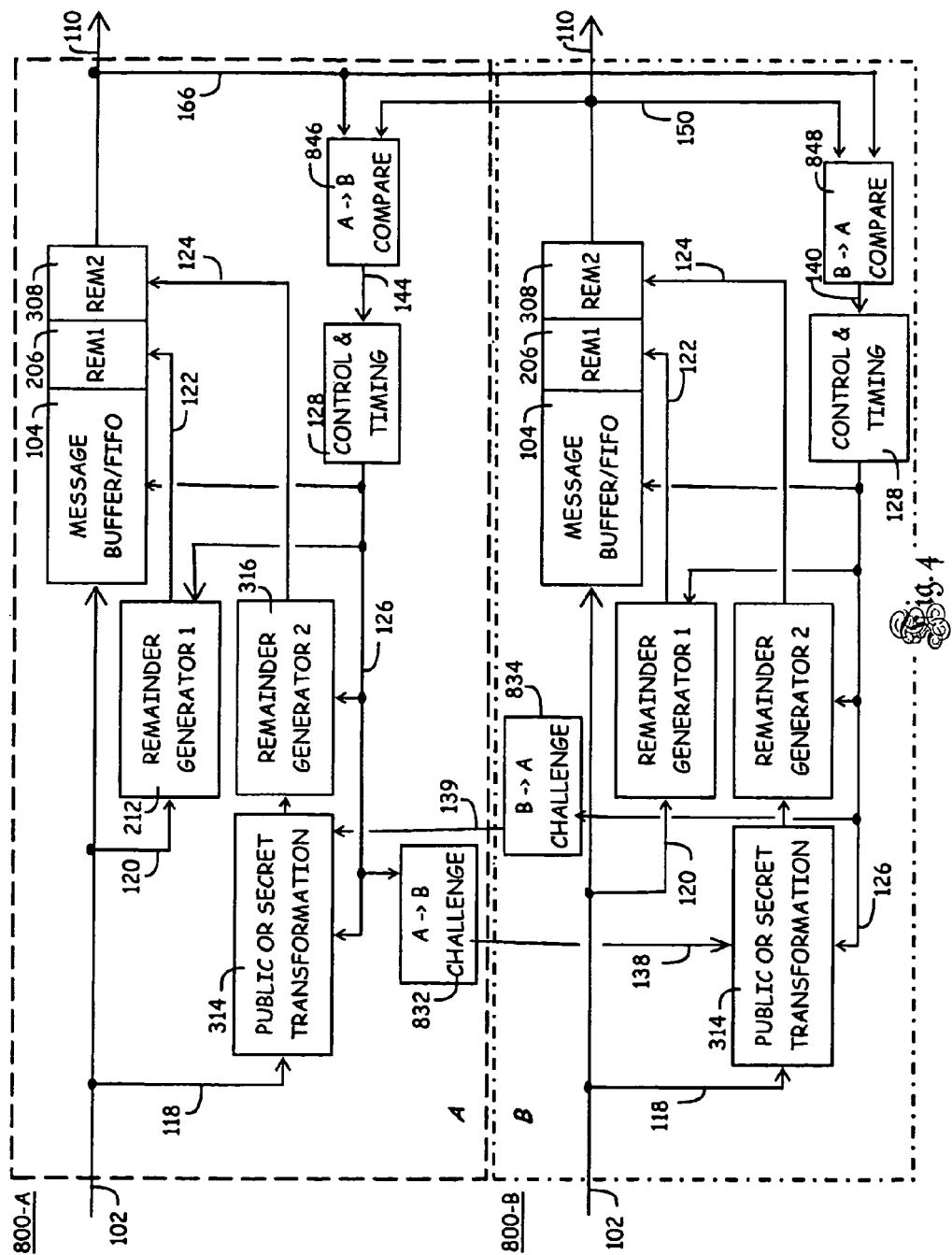

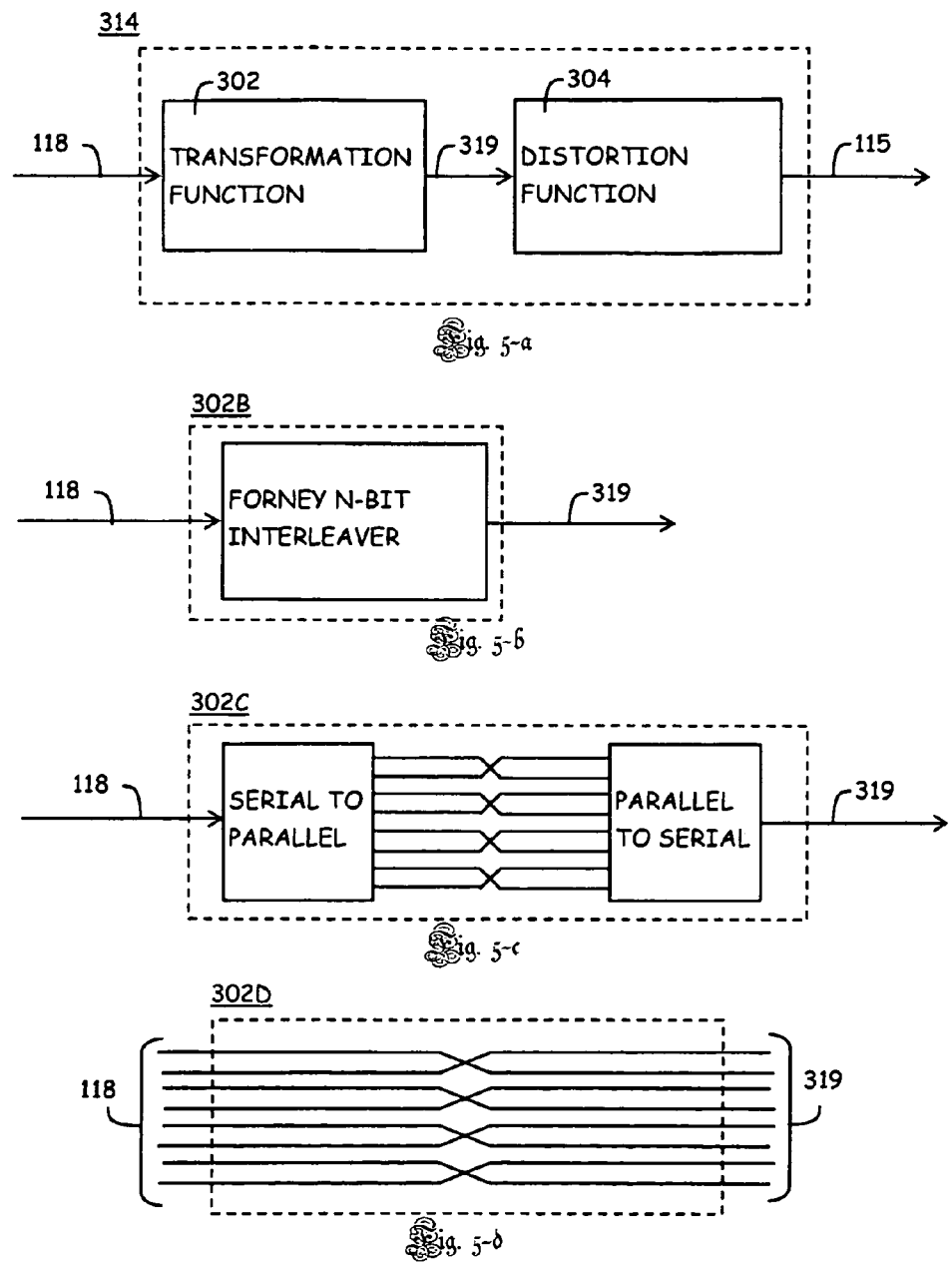

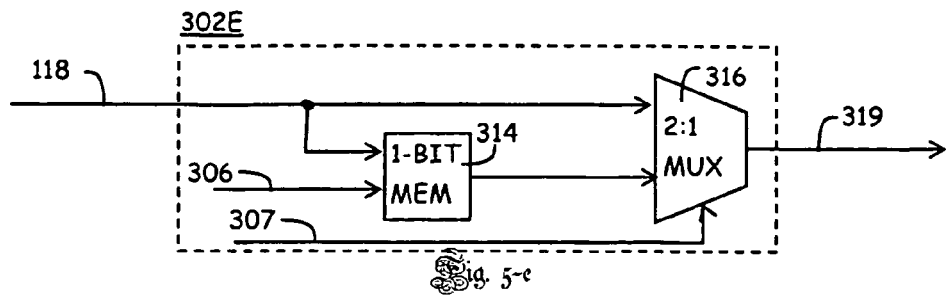
Fig. 5-e
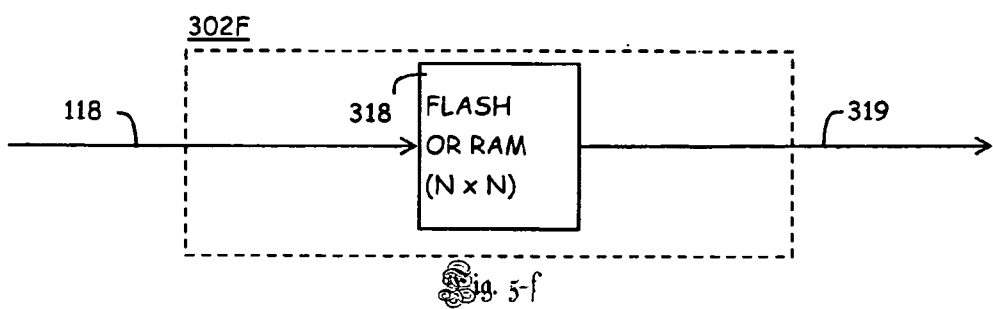
Fig. 5-f
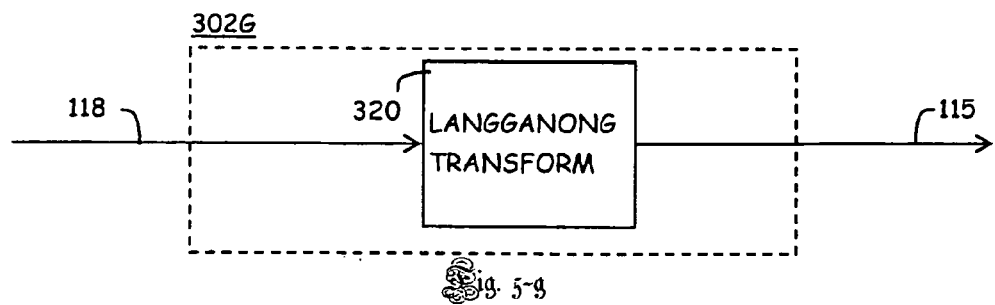
Fig. 5-g
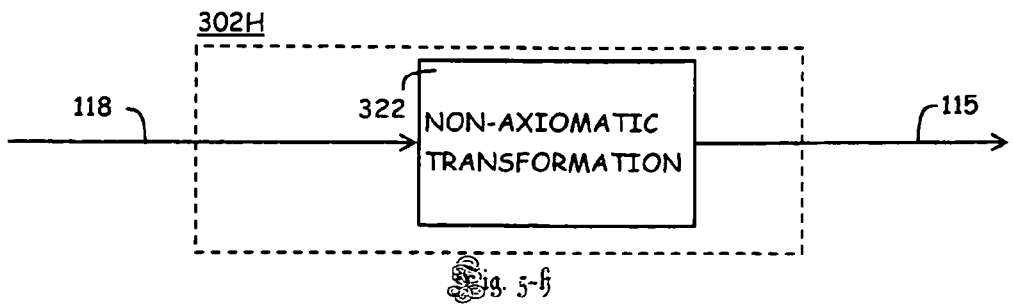
Fig. 5-h

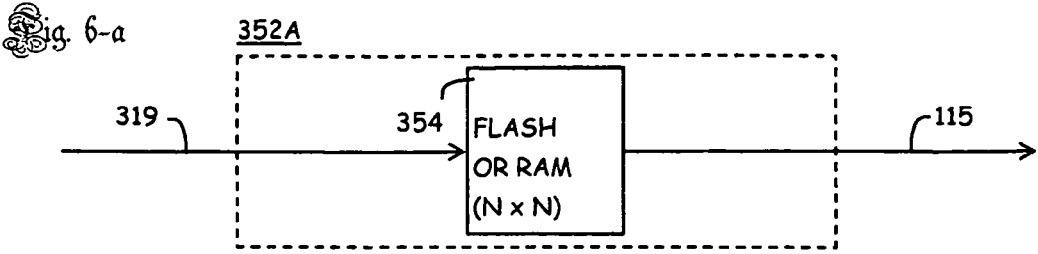
Fig. 6-a
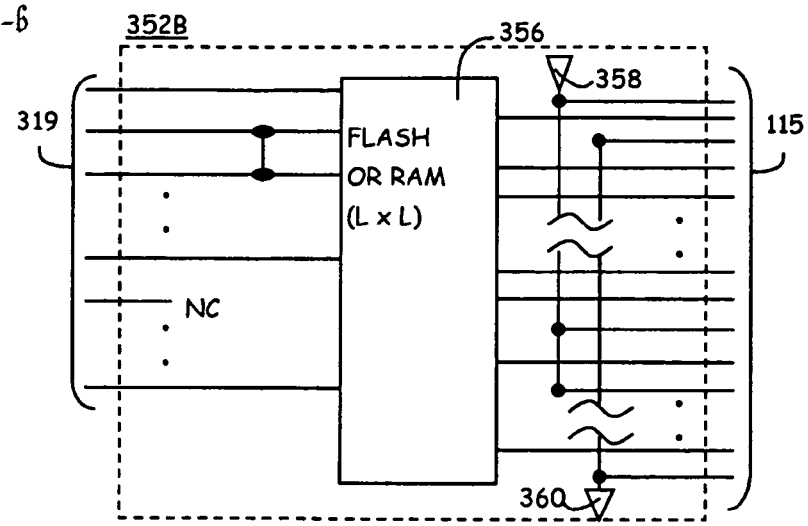
Fig. 6-b
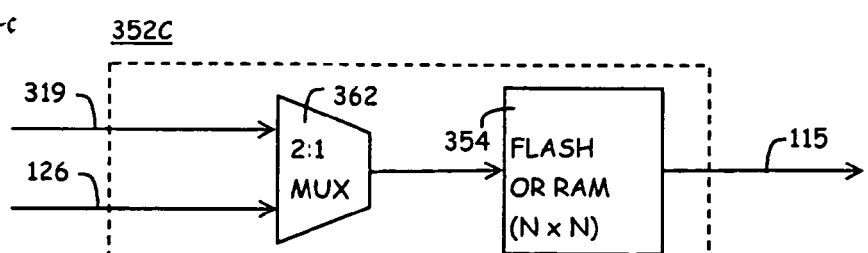
Fig. 6-c
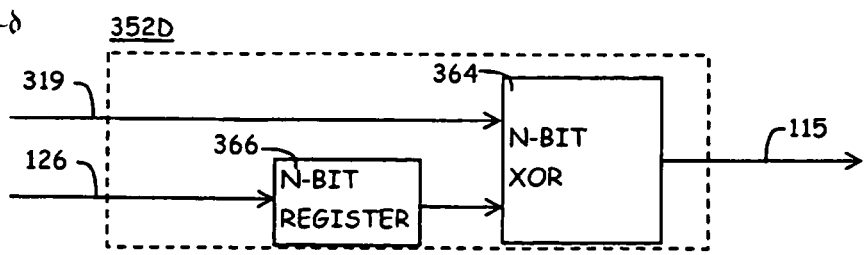
Fig. 6-d

METHOD OF IDENTIFYING AND PROTECTING THE INTEGRITY OF A SET OF SOURCE DATA

This application claims the benefit of U.S. Provisional Patent Application No. 61/282,713 filed Mar. 22, 2010, the disclosure of which is incorporated herein by reference in its entirety.

TECHNICAL FIELD

The present invention relates to a method of identifying and protecting the integrity of a set of source date, and in particular to such a method that extends the capability of error detection and correction methods to include improved identification and protection.

BACKGROUND ART

What W. W. Peterson said in Scientific American in 1962, "Error-free performance is the goal of every good communication system," is still a truism. Yet, in the global business model, there is an emergence of fundamentally different, malicious attacks that: a) modify designs, b) tamper with hardware, and c) contain spoofed software in mission- and safety-critical systems. In the past conventional error detection and correction (EDAC) techniques have largely been adequate to satisfy a specified probability of undetected (random) error threshold for data transfers, particularly when protecting boot firmware in embedded systems. However, in today's marketplace, additional fortification of these algorithms is needed to address the identification, integrity and security issues of outsourced system development and data delivery. The problem of detecting, correcting, tracing, or countering a deliberate corruption of systems and data due to a cyber attack is of particular concern. Peterson talked of protection from "noise," yet, today we must include protection from intelligent attacks, in critical environments. These critical environments must be fortified to survive through the loss of physical security. Litanies of techniques have been tailored to various levels of need. Generally, encryption is used to secure most critical data, but there is a niche need for data protection (or tamper detection) through systematic encoding that doesn't utilize encryption. Some dual-redundant systems have stringent real-time startup and response requirements. Any extension to EDAC processing or additional security algorithms to address malicious attacks must still meet the timing requirements.

In response to potential boot firmware security breaches, some computing devices provide security measures to ensure that the boot firmware comes from a trusted source. These security measures rely on digital signatures, which uniquely identify the source of the associated boot firmware. The computing device can decode a digital signature to identify the firmware and accept or reject the boot based on the comparison of the signature to a known value. The difficulty with this approach when there is a malicious attack on the design, is that the known value can easily be modified to provide a match to the calculated value. Other deficits would be of a computing device that only verifies the firmware once after installation, or only at boot time. After the boot, the firmware is assumed to not have been altered dynamically. These threats aren't prevented by passive security measures.

Advances in error control coding have enabled their use to be ubiquitous in digital information storage and transfer. Examples of this digital information include phones, the internet, DVDs, electronic commercial transactions, disk drives, ISBN numbers, UPC codes, and RFID tags.

The generalized abstraction of the parts of error control coding are given in the prior art. In a basic example of the prior art, FIG. 1-$a$, source data enters an EDAC encoder, and after encoding, it is then transmitted or transferred over a channel. On the data sink end, after the channel, the encoded data is checked for errors by the EDAC decoder. One type of system, using this basic design, responds with a retry request if an error is detected. In another type, errors are corrected by the decoder. Both types of systems have limits on the number and type of errors that are detectable, correctable, undetectable, and uncorrectable. These types of EDAC systems are not designed, in general, to provide protection from cyber attacks, but are designed to handle random or burst errors, or some combination of random and burst errors.

The prior art of FIG. 1-$b$ adds data security by adding encryption encoding and decoding. Some performance and size limits are improved by preceding the encryption with a compression stage, as is well known in the art. Typically these steps are much more time intensive than just the EDAC stage, and impractical in some real-time embedded systems for the associated risk.

More examples in the art exist that show variations to the basic example mentioned and to the more complex example, or combinations through concatenation, interleaving, redundancy, and feedback. The use of these variations has led to disk drives boasting of probabilities of undetected errors, after error correction, on the order of $10^{-18}$.

Some applications require very low probabilities of undetected errors. For the most critical avionics applications, there are requirements of undetected error probabilities of $10^{-9}$, plus no single point of failure, and no common cause for hardware systems. For a similar critical software system, it would be required to satisfy what is called "Level A" objectives, rather than the $10^{-9}$, but still satisfy the other requirements.

It has been pointed out that there are potential gaps in the level of protection from cyber attack in the end-to-end life cycle of critical avionics software systems. The solution to protecting the gaps has been the dependability of the EDAC encoder remainder, attached to the boot code image, 902, at development time, see FIG. 7 904.

Additional mitigation procedures are necessary when it is assumed that the strong protections provided in the various physical layers and devices will result in adequate end-to-end protection of data, from emerging threats at higher levels, for the data's life cycle. A practical partial solution, again, is to attach sufficient protection to the data at the source and let it remain attached for the data's lifespan, checking it along the way. As mentioned this sole reliance on EDACs for protection is no longer sufficient for critical systems, in light of the new threats, but any solution has to be simple, cheap, adequate, and fast, as always.

In U.S. Pat. No. 3,786,439, issued on Jan. 15, 1974, McDonald introduced the novel idea, "Error detection is enhanced by using multiple independent error codes combined with non-linear changes in the data field as applied to different error codes." It is then said to use a non-linear permutation by "scrambling track-to-error code relationships between a plurality of independent codes." The definition of non-linear is not explicitly defined, but later in the discussion it seems to mean not to do a cyclic permutation. It indicates breaking the data set into subsets with one ECC-3 covering all data end-to-end in the statements " . . . generate a second non-linearly related data field" and "with the non-linear difference between the two codes, a high degree of reliability is provided in that the probability of an error condition residing in the same mathematical subfield of the two codes becomes highly remote." Later, it is stated that each of the polynomials has an 1+x term. In the claims, following the methods would indicate "a third set of errors less than the first and second sets by including errors not in said first and second sets . . . "

Following McDonald, in U.S. Pat. No. 5,392,299, issued on Feb. 21, 1995, Rhines et al., introduces the idea of an triple orthogonally interleaved error correction system. The system is for random & burst enhanced protection tailored to the channel at hand. The scrambling is fixed and the method requires an orthogonal interleaving of three parts. The definition of orthogonal is a 'shuffling' to enhance the protection against burst errors. Later it states that it is well known in the art to employ an interleaving process either before or after encoding to provide additional protection against included errors. The interleaving is defined to be a process where consecutive bytes are separated from each other, to protect against burst errors.

In U.S. Pat. No. 5,673,316, issued on Sep. 30, 1997, Auerbach et al. discuss the creation and distribution of a cryptographic envelope that is an aggregation of information parts, where each of the parts to be protected are encrypted.

In the abstract of "Factoring Large Numbers with the TWINKLE Device," Adi Shamir states "The security of the RSA public key cryptosystem depends on the difficulty of factoring a large number n which is the product of two equal size primes p and q. He also states "The current record in factoring large RSA keys is the factorization of a 465 bit number . . . [The TWINKLE] technique can increase the size of factorable numbers by 100 to 200 bits . . . " and that " . . . can make 512 bit RSA keys (which protect 95% of today's E-commerce on the Internet very vulnerable."

In the 1996 paper by Berrou, it states "2) Non uniform interleaving: It is obvious that patterns giving the shortest distances, such as those represented in FIG. 5, can be 'broken' by appropriate non uniform interleaving, in order to transform a separable FC [Finite Codeword—finite distance from 0] pattern into either a non separable or a non FC." "Non uniform interleaving must satisfy two main conditions: the maximum scattering of data, as in usual interleaving, and the maximum disorder in the interleaved data sequence. The latter, which may be in conflict with the former, is to make redundancy generation by the two encoders as diverse as possible."

DISCLOSURE OF INVENTION

The invention is a method of identifying and protecting the integrity of a set of source data. The source data may be in the form of software or transmitted data. Steps (a) and (b) may be programmable. The source data may also be totally or partially embedded in hardware.

An embodiment of the invention may include the following steps:

(a) passing the source data through a transformation to produce a transformed set of source date;

(b) distorting the transformed set of source data with a distortion function to produce an intermediate set of source data; and (c) passing the intermediate set of source data through an EDAC (Error Detection and Correction) algorithm to produce a remainder and attaching the remainder to the set of source data to produce an encoded set of source data.

In an alternative embodiment, the method may also include the step of passing the set of source date through a second EDAC algorithm to produce a second remainder and attaching the second remainder to the encoded set of source data.

In the case of embedded systems, one or both remainders may be calculated prior to embedding the set of source data, such as, by the build computer.

EDAC algorithms typically encode the source data and produce a remainder that serves to alert the user to alterations, either intentional or accidental, in the source data. Many EDAC algorithms are known that would be suitable for the practice of this invention. The EDAC algorithm and, if used, the second EDAC algorithm may be the same or different. The EDAC algorithms typically operate by using a polynomial divisor. The EDAC algorithms may use different polynomials. Examples of EDAC algorithms known in the prior art include CRC algorithms, Reed-Solomon encoding, Viterbi encoding, Turbo encoding, MD5 algorithms and SHA-1 hash algorithms.

One simple type of transformation is an interleaver. Many types of interleavers are known in the art. Interleavers alter the relative position of portions of the source data. As shown in U.S. Pat. No. 5,393,299, an interleaving could be selected to make the results orthogonal to the original. In addition, an interleaver could be as simple as swapping the position of pairs of bits 2 (a "2-bit rotation"). Depending on the chosen polynomial, a 2-bit rotation could be considered an affine transformation. Interleavers can also operate on larger blocks of data in more complex ways. A prior art interleaver is the so-called Forney interleaver. Interleavers can be totally or partially implemented in hardware. For example, an interleaver could include a serial-to-parallel data converter whose output is interleaved by a criss-cross wiring matrix. The interleaver can also be implemented as a serial-to-parallel data converter whose output is interleaved by an N-by-N FLASH memory or an N-by-N RAM memory. The transformation may also be implemented in software, for example, by performing an affine transformation that makes a non-orthogonal transformation on the source data. Other such transformation may include transforms without an inverse function, without preserving rigid motion, or a LangGanong Transformation, or from a non-axiomatic transformation.

One example of the distortion function may comprise an exclusive OR operation between the transformed set of source data and a binary pattern. The binary pattern may be extracted from an N-by-N RAM memory.

One type of non-axiomatic transformation includes the distortion function as a part of the transformation. An example is a mapping from m elements to n elements, where m<n or m>n. In some embodiments, the method may also include the step of verifying the integrity of the source date by recalculating one or both remainders, comparing the recalculated value of the remainders with the original value of the remainders, comparing the recalculated values of the remainders with the original value of the remainders and providing an indicator if comparison between either set of remainders is not the same. The remainders may be verified periodically or aperiodically. The values of the remainders may be provided to a display means, by placement on a serial bus, by placement on a parallel bus or to control logic. The values of the remainders may be provided in response to a request.

BRIEF DESCRIPTION OF DRAWINGS

FIG. 1-*a* is an illustration of the basic elements of digital communication systems in the prior art.

FIG. 1-*b* is an illustration of more comprehensive elements of digital communication systems in the prior art.

FIG. 1-c is an illustration of the composition of the IDAC Encoder and the IDAC Decoder elements of the present invention.

FIG. 1-d is an illustration of the EDAC1 Encoder, EDAC2 Encoder, and other components of the IDAC Encoder.

FIG. 4 is an illustration of a dual redundant embodiment of two IDAC Decoders with challenge components.

FIG. 5-a is an illustration of the breakdown of the Public or Secret Transformation block of an IDAC Encoder or IDAC Decoder.

FIG. 5-b is an illustration of one embodiment of the Transformation Function block of IDAC, using a Forney Interleaver.

FIG. 5-c is an illustration of another embodiment of the Transformation Function block of IDAC, using serial to parallel and parallel to serial converters around a 'wire' interleaver.

FIG. 5-d is an illustration of still another embodiment of the Transformation Function block of IDAC, using a 'wire' interleaver.

FIG. 5-e is an illustration of another embodiment of the Transformation Function block of IDAC, using a 1-bit stack.

FIG. 5-f is an illustration of another embodiment of the Transformation Function block of IDAC, using an N×N FLASH or RAM.

FIG. 5-g is an illustration of combining the Transformation Function block with the Distortion Function block of IDAC, by using a LangGanong Transform.

FIG. 5-h is an illustration of a non-axiomatic transformation in an embodiment of the IDAC.

FIG. 6-a is an illustration of an embodiment of the Distortion Function block of IDAC, using and N×N FLASH or RAM.

FIG. 6-b is an illustration of another embodiment of the Distortion Function block of IDAC, using and L×L FLASH or RAM, that is non-invertible, not one-to-one, and not onto.

FIG. 6-c is an illustration of an embodiment of a combined Transformation Function block and a Distortion Function block of IDAC, using an N×N FLASH or RAM, that is updateable.

FIG. 6-d is an illustration of another embodiment of a combined Transformation Function block and a Distortion Function block of IDAC, using an N×N FLASH or RAM, that is updateable.

BEST MODE FOR CARRYING OUT THE INVENTION

Figure 2:
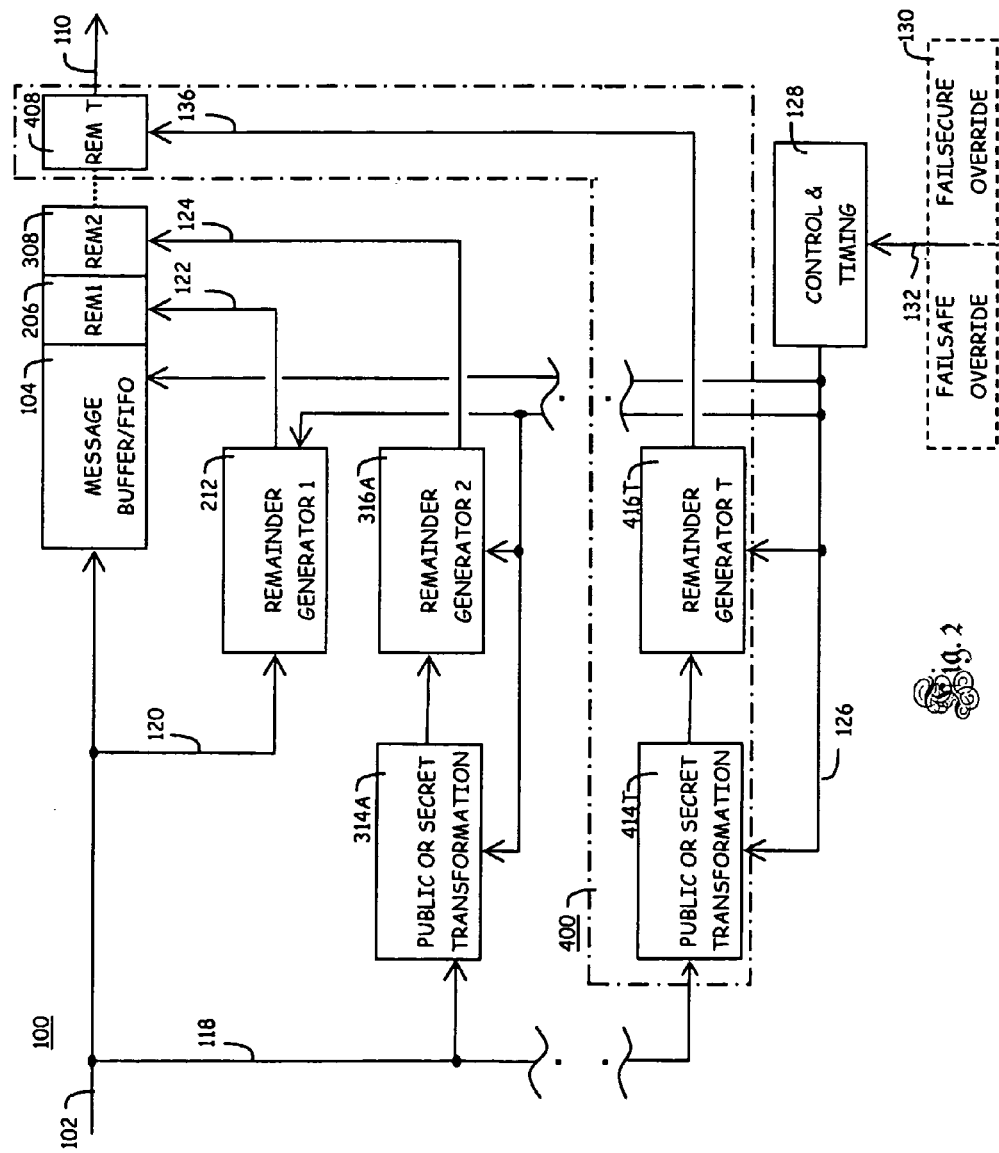
FIG. 2 is an illustration of the 'T' copies of an EDAC Encoder component in an embodiment of an IDAC Encoder.

In the following descriptions and discussion the term "codeword" includes the original set of source data plus a relatively unique tag (also called a digital signature or hash) that is the result of one of many possible encodings, as is well known in the art, such as, without limitation, a) Cyclic Redundancy Check (CRC), b) Reed-Solomon, c) Viterbi, d) Turbo, e) Low Density Parity Check (LDPC), f) Message Digest 5 (MD5), and q) Secure Hash Algorithm (SHA-1). The set of source data may also be referred to herein as a message, data message or source data. The remainder from an EDAC algorithm may also be referred to herein as a residue.

The present invention relies on a counter-intuitive idea when using error detection and correction codes. The idea is to <u>add errors</u> to the data, in fact, so many errors as to exceed the capability of the EDAC. By adding errors, when encoding a copy of the data message that has been transformed, on the receiving end, spoofing will be revealed (or reveal errors that were previously undetectable or uncorrectable). The technique improves the ability to detect spoofs, and can be added to the data message at creation time as a fortified digital signature that is harder to tamper than just the first EDAC. So the basic idea is to use one EDAC just as in the prior art, and then use the second one as an identifier, or digital signature, using the same encoder as the first one (or a duplicated encoder in hardware or in software). In addition, since the transformation step and the distortion step have been separated and done in parallel, they become programmable. The details of the steps can be public or private, etc. as mentioned before. Another advantage is, since it is done in parallel, it is scalable. For example, let's take a 32-bit CRC (call it REM1). By running the data message through a transformation and distortion, a second 32-bit CRC (or REM2) is available, without having to resort to an independent polynomial. Running the data through a third transform and distortion, yields, yet, another 32-bit CRC (say, REM3), for a total, so far of 96-bits. For a rather small 512 byte message, the possibilities for the distortions are $2^{4096}-1$, which is a very large number. By adding a non-axiomatic transformation, say, a mapping from 4096 to 8192, the possibilities are much larger. There are numerous other potential advantages. The details of some embodiments follow.

As illustrated in FIG. 1-c, in one embodiment source data enters an Identification, Detection, and Correction (IDAC) Encoder 100 and is routed to two separate. EDAC Encoders, EDAC1 Encoder 200 and EDAC2 Encoder 300. The EDAC1 Encoder can be any of the many that are well known in the art. The data is encoded and the residue is passed to the channel, again, as is well known in the art. The EDAC2 Encoder can include any encoder, too, but for this embodiment, we will use the same type of encoding as EDAC1. A duplicate copy of the source data is encoded and is presented to block 300 and the residue is passed to the channel, as before. The details of blocks 200 and 300 are described later. Likewise, the IDAC Decoder 500 comprises an EDAC1 Decoder 600 and an EDAC2 Decoder 700, that are described later.

If EDAC2 300 is configured with an affine transformation internally, then its EDAC functions are similar to U.S. Pat. No. 3,786,439, except without using an independent code and EDAC2's transformed data is not the data that is transmitted or transferred to the channel. EDAC2 is not transforming the data to make it more resistant to burst errors as in U.S. Pat. No. 3,786,439, so EDAC2 sends the original unaltered data, systematically. The intention of EDAC2 is to make it more resistant to malicious attacks. Also, U.S. Pat. No. 3,786,439 does not include a distortion step. There are several other dissimilarities.

As illustrated in FIG. 1-d, the source data enters the illustrative embodiment of the IDAC Encoder 100 at 102. The data enters the message buffer/fifo 104 unchanged, under control or at locations provided by the Control and Timing block 128, simultaneously or sequentially processed by the Public or Secret Transformation block 314 via 118, of EDAC2 300 (the component details of EDAC2 are marked with a dash-dot-dot line), also directed by 128. This block, 314, makes a locally known change (or locally temporarily generated, or remotely received and provided by 128 via 126) to the data and then transfers the altered data to the Remainder Generator 2 block 316, of EDAC2 300, as check/identifier. A more detailed description is provided in the section entitled Data Transformations set out below. At this time (or sequence step) or using the same locations provided by 128, the Remainder Generator 1 block 212, of EDAC1 200 (the component details of EDAC1 are marked with a dash-dot line), accumulates the check data that is well known in the art. After all the source data has been processed by blocks 314, 316, 212, 104; block 212 via 122 sends its check data to the REM1 block 206, of EDAC1 200, and block 316 sends its check data to the REM2 block 308, of EDAC2 300, via 124. The unaltered message source data from 102, goes through block 104, to 110 under control of block 128 either before the source data, after the source data, some combination, or alone. The REM1 check/identifier data and the REM2 check/identifier data are merged with this source data at 110 under control of block 128. The process just described, can be realized in hardware only circuits and/or a combination of hardware and software (firmware). Optional overrides for safety or security to disable the checking, when incorporated into verification designs or detect and counter designs, if needed 130. The balance of dependability and security can be tailored per application via block 130, meaning to be only safety, to be only security, or to be some combination.

As illustrated in FIG. 2, since the encoding operations of EDAC1 200 and EDAC2 300 are done in parallel, the IDAC can be configured with T copies of EDAC2-type encoders. (The component details of EDAC T 400 are marked with a dash-dot line.) T copies of the decoding operation are possible as well.

Figure 3:
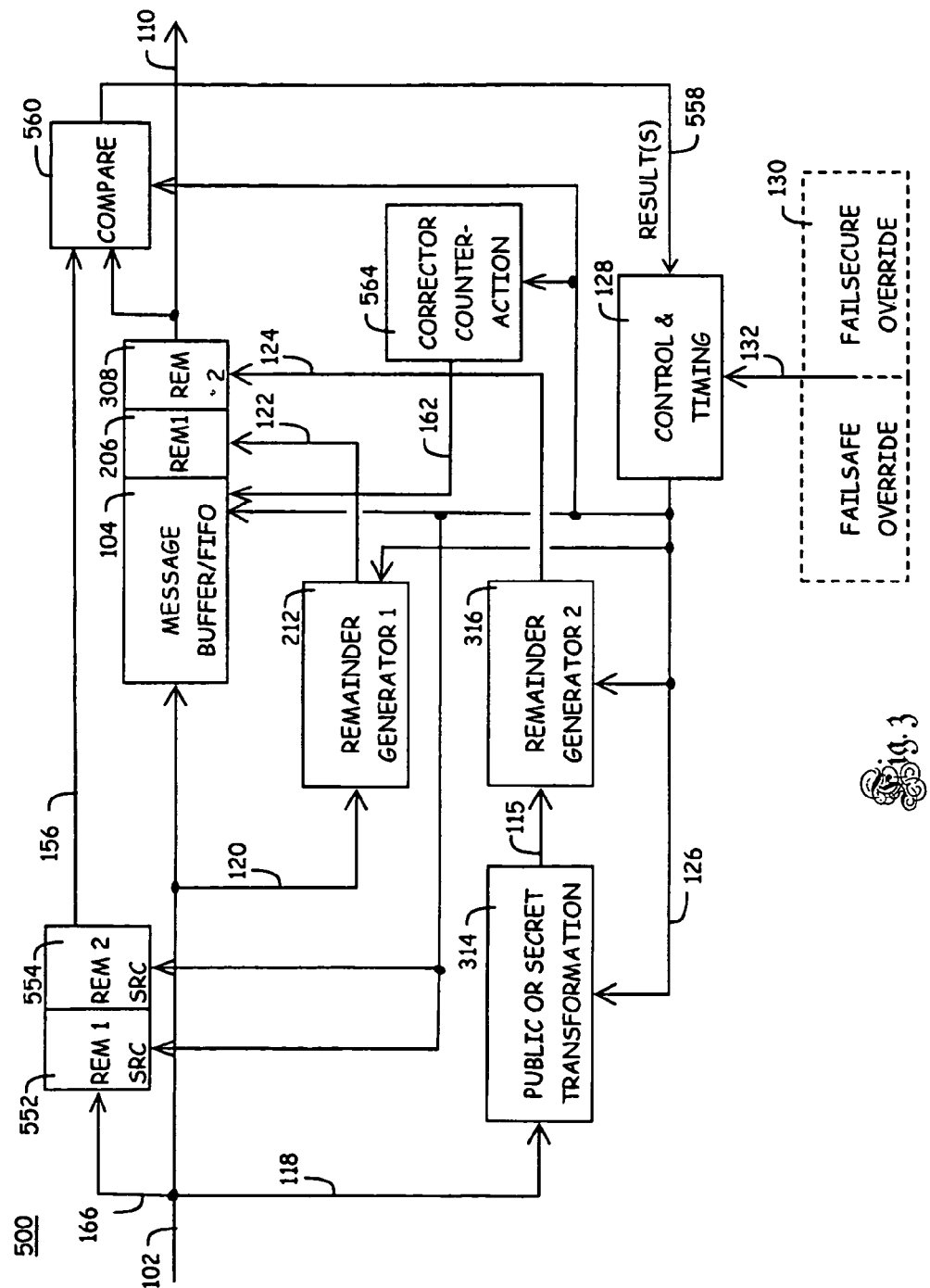
FIG. 3 is an illustration of the EDAC1 Decoder, EDAC2 Decoder, and other components of the IDAC Decoder.

As illustrated in FIG. 3, again, the source data enters this embodiment of the IDAC Decoder at 102. The source data in this case, already has the check symbols merged with the message at 102, resulting in a codeword that is to be recomputed and verified by the embodiment in FIG. 3, with the locally known or remotely provided through 128. The primary check symbol is removed at the REM1 SRC block 552, and the secondary check symbol is removed at REM2 SRC block 554. The message portion of the codeword is processed through block 104. The difference between the processes of FIG. 1-*d* and FIG. 3 is that in FIG. 3, a new set of check symbols is calculated for blocks 206 and 308, and compared by block 560, under control of block 128, a pass/fail indication or the REM is presented to block 128, via 558. The control and timing processes of block 128 signal block 564 for correctable integrity errors with feedback to the message via 162 or counter-action.

The embodiment of FIG. 4 is an enhancement to FIG. 1-*d* and FIG. 3 utilizing two copies, 800-A and 800-B, of the apparatus and methods of the IDAC, with challenge components added. Each copy could be implemented as cross-checks between a dual-redundant hardware only apparatus and method; and as a hardware/software combination; or some other dual or more variation. In this case singleton, periodic or aperiodic challenges come in the form of locally generated, locally received, or locally known or pseudorandom message alterations (affine, non-axiomatic, or received), determined at the beginning of a challenge epoch. These alterations are presented to the other side 832, 138 (or 834, 139) of the system and an actual secondary check symbol must be presented to the first side 150, 846, 144 (or 166, 848, 140) before the expiration of the epoch. (If a message transformation consists of only a linear transformation, a previously colliding spoof could remain colliding, as seen previously in Example 1.) Due to infeasibility of the polynomial reconstruction problem, it is unlikely that the message is spoofed by a malevolent source during the epoch. The minimum length of an epoch is unknown to the author, but research indicates it could be an NP-hard (NP-Complete) calculation. The applicant is unaware of any known solutions. According to the paper ["Cryptography and Decoding Reed-Solomon Codes as a Hard Problem," Aggelos Kiayias and Moti Yung, 2005, IEEE, 0-7803-9491-7], choosing the number of bit changes to be greater than the square root of (n*(k−1)) (see paper for details), the polynomial reconstruction problem remains unsolvable. So choosing the number of bit changes to be just under this value seems to mean that any additional bit changes from malicious sources would result in exceeding the threshold, and thus be unsolvable (i.e., unspoofable) by the malevolent source. In other words, the correction capability of the EDAC algorithm has been exceeded by too much. Another possibility is to supply the alteration as a one-time pad, which is well known in the art to be unsolvable.

As illustrated in FIG. 5, the Public or Secret Transformation block 314 comprises two components, a Transformation Function 302, with data entering via 118 and exiting via 319; and a Distortion Function 304, with data entering via 319, and exiting via 115.

FIG. 5-*b* is an embodiment of the Transformation Function 302, that is comprised of a Forney Interleaver 302B, that is well known in the art.

FIG. 5-*c* is an embodiment 302C of the Transformation Function 302, comprised of a first a Serial to Parallel converter, followed by a wire interleaver, followed by a Parallel to Serial converter, all components well known in the art.

FIG. 5-*d* is an embodiment 302D of the Transformation Function 302, comprised of parallel input data 118, a wire interleaver, with transformed parallel data exiting at 319.

FIG. 5-*e* is an embodiment 302E of the Transformation Function 302, comprising a 1-bit stack 314 to rotate every two bits. Serial input data enters at 118, and 306 controls the stack. 307 selects and controls the data for output 319 from the 2 to 1 multiplexer Mux 316 after the transformation.

FIG. 5-*f* is an embodiment of the Transformation Function 302, comprised of a N×N FLASH or RAM 318. There is a one-to-one mapping from input 118 to output 319. The FLASH entries for the transformation are entered beforehand. The FLASH may be removable, as needed. A data pattern at 118 is used as an address to look up entries in 318, then the entered value of that address is output at 319. Depending on the preconfigured entries of the FLASH, this transformation could be an example of a non-axiomatic transformation. For a data message with N=64 Kbytes, the FLASH would be 32 GBytes.

FIG. 5-*g* is an embodiment of the Transformation Function 302, comprised of a LangGanong Transformation 302G described previously.

FIG. 5-*h* is an embodiment of the Transformation Function 302, comprised of a Non-Axiomatic Transformation 302H described previously.

FIG. 6-*a* is an embodiment 352A of the Distortion Function 302, comprised of a N×N FLASH or RAM 354. There is a one-to-one mapping from input 118 to output 319. The FLASH entries for the distortion are entered beforehand. The FLASH may be removable, as needed. A data pattern at 319 is used as an address to look up entries in 354, then the entered value of that address is output at 115. Depending on the preconfigured entries of the FLASH, this distortion could be part of an example of a non-axiomatic transformation. For a data message with N=64K bytes, the FLASH would be 32 G bytes.

FIG. 6-*b* is an embodiment 352B of the Distortion Function 302, comprised of a L×L FLASH or RAM 356. There need not be a one-to-one or onto mapping from input 118 to output 319, when using a non-axiomatic transformation. The FLASH entries for the distortion are entered beforehand. The FLASH may be removable, as needed. A data pattern at 319 is used as an address to look up entries in 356, then the entered value of that address is output at 115. Depending on the preconfigured entries of the FLASH, this distortion could be part of an example of a non-axiomatic transformation. For a data message with L=64K bytes, the FLASH would be 32 G bytes. Some input wires of 319 may not be connected (NC) to the FLASH, and some input wires can be shorted together. Some output wires of 115 can be tied to logical "1" at 358, and some can be tied to logical "0" at 360, to create the distortion following a non-axiomatic transformation.

FIG. 6-*c* is an embodiment 352C of the Distortion Function 302, comprised of a N×N FLASH or RAM 354. There is a one-to-one mapping from input 118 to output 319. The FLASH entries for the distortion are entered beforehand. The FLASH may be removable, as needed. A data pattern at 319 is used as an address to look up entries in 354, then the entered value of that address is output at 115. Depending on the preconfigured entries of the FLASH, this distortion could be part of an example of a non-axiomatic transformation. For a data message with N=64K bytes, the FLASH would be 32G bytes. The data pattern of challenges come in via 126 selected by Mux 362 and stored in FLASH 354.

FIG. 6-*d* is an embodiment 352*d* of the Distortion Function 302, comprised of a N-bit register 366 followed by a N-bit XOR 364. A data pattern at 319 is the output from the Transformation Function that is XOR'd with the contents of the N-bit register. The N-bit register is updateable via 126. If so configured, data pattern challenges come in via 126.

Figure 7:
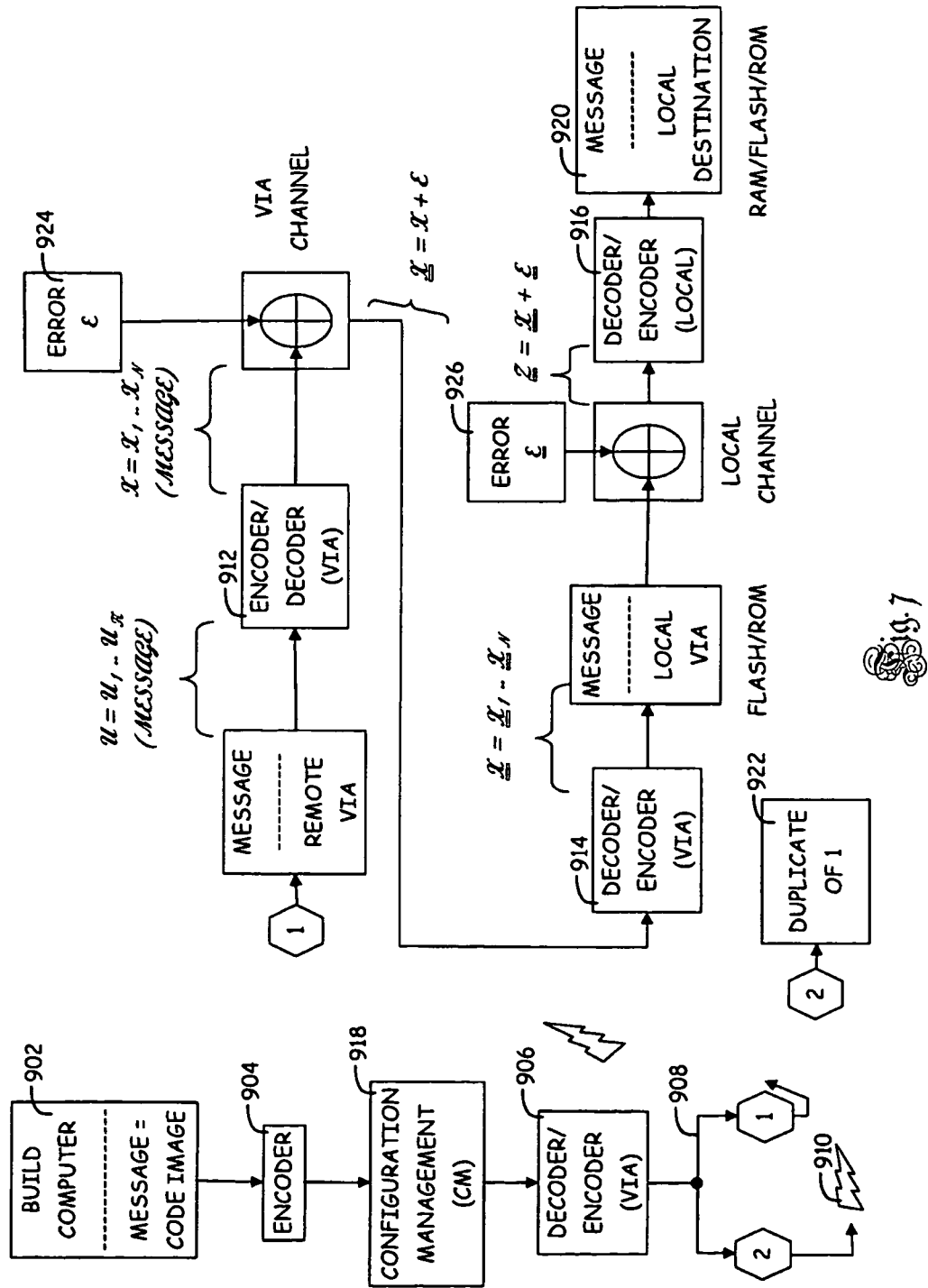
FIG. 7 is an illustration of the elements in the end-to-end life cycle of dual-redundant embedded firmware protected by EDAC Encoders and Decoders.

FIG. 7 illustrates the usage of IDAC Encoders and Decoders in the life cycle of embedded firmware. The embodiment in the build computer 902, is a software implementation that attaches the REM1 and REM2 digital signatures (identification and EDAC) of the encoder 904, before storage in the Configuration Management archive 918. For various activities, such as, installation, verification, test, quality assurance, repository storage, escrow storage, export activities, certification, reuse, maintenance, development, the data message is retrieved from the archive and identified and verified by the IDAC Decoder 906. For a dual-redundant installation, two copies are installed via 908, and again identified and verified by the IDAC Decoder/Encoder 912. If using a Field-Loadable device, or upon entry at a foreign port, or certification or inspection activities, the data is identified and verified at 914. Finally, another IDAC Decoder/Encoder 916 identifies and verifies the data before loading into the destination 920. In the dual-redundant system 922 is a duplicate of the first path and devices.

Operation of the Invention

Unauthorized or unintended modifications to digital data are detectable by error detection and correction methods, as is well known in the art. The new improvement embodied in the invention is the increased ability to detect previously undetected alterations over using the prior art. The apparatus and method accomplishes this improvement by changing the original message at locations known or provided to both the receiver and the sender, then calculating a secondary check symbol on this now second message. The second message need not be stored, only the secondary check could be transmitted or transferred, to become part of the codeword.

Data Transformations (Public or Secret Transformations)

The transformation consists of either an affine or non-axiomatic transformation. Affine transformations include linear transformations and translations. Non-axiomatic transformations, defined earlier, include non-linear transformations that are neither one-to-one or onto, and translations. One example of an affine transformation is a permutation and an offset (possibly implemented with a shift and an XOR; for parallel input data, just the hard-wired criss-crossing of the data bits and a half-adder; or swapped flip-flop outputs for serial data), where the result is a member of the original set. An example of a non-axiomatic transformation may yield a result that is outside the original set (and could be implemented by inserting or changing bits before, during, or after the message data bits. In addition, it could be implemented by deleting or ignoring some bits, or shorting (dot-OR) bits together, of the message.) Hardware and/or Software, or both could be implemented in parallel for an increase in performance, and could be repeated with different transformations, multiple times, for increased strength, hardness, and a decrease of undetected alterations.

A couple of examples will serve to demonstrate both a weaker and a stronger application of the methods. First the weaker use of the method that fails to detect a spoofed change to digital data, but still provides a distinct signature, is outlined.

Example 1

For simplicity of explanation and calculation, take a 3-byte message to be sent (using a 16-bit CRC algorithm). That message is spoofed, such that, it has the same residue as the original, such as:

| TYPE | MESSAGE | RESIDUE (CRC) |
| --- | --- | --- |
| Original | 0x2A301C | 0xDAC2 |
| Spoofed becomes | 0xC06454 | 0xDAC2 (matches) |

Then toggle 1st bit at received end (this is the distortion step, but applied without an affine transformation). (Mathematically this means do the following:
0x2A301C⊕0x800000=0xAA301C.)

| rec'd orig then is | 0xAA301C | 0xD62E |
| --- | --- | --- |
| rec'd spoof becomes | 0x406454 | 0xD62E (matches again - spoof not detected) |

How about making the distance between toggles >16 bits? Toggle 1st and last bits (23 bits apart) (limited to a distortion-only step, again):
(Mathematically: 0x2A301C⊕0x800001=0xAA301D.)

| rec'd orig then is | 0xAA301D | 0xC7A7 |
| --- | --- | --- |
| rec'd spoof becomes | 0x406455 | 0xC7A7 (still not detected) |

Next let's precede the distortion with an affine transformation, in this case, switching every two bits.

Example 2

| TYPE | MESSAGE | RESIDUE (CRC) |
| --- | --- | --- |
| Original | 0x2A301C | 0xDAC2 |
| Spoofed becomes | 0xC06454 | 0xDAC2 (matches) |

Then rotate every two bits at the received end (a trivial selection of an affine transformation):

| rec'd orig then is | 0x15302C | 0x2728 |
| rec'd spoof becomes | 0xC098A8 | 0x3289 (no match - spoof detectable) |

The next case is to rotate every two bits and toggle first bit at the received end:

| rec'd orig then is | 0x95302C | 0x2BC4 |
| rec'd spoof becomes | 0x4098A8 | 0x3E65 (no match - different detection) |

A non-trivial selection of an affine transformation requires a rigorous analysis of the system against known relationships for known polynomials, when probability calculations are needed.

So what happened in example 1? It might be explained by talking about distance, but distance has a different meaning in different contexts. On the number line, the distance between two points, say 7 and 4, is just the absolute value of their difference, ($|7-4|=3$). In Euclidean 2-space, the distance between two points, $a=(x_0, y_0)$, and $c=(x_1, y_1)$, is typically thought of using the Pythagorean Theorem for a triangle, with vertices $(x_0, y_0)$, $(x_1, y_0)$, $(x_1, y_1)$. Without loss of generality, $\overline{ac}$ is the hypotenuse. So, $$dist(\overline{ac}) = \sqrt{(x_1-x_0)^2+(y_1-y_0)^2}.$$

This is also called the norm $\|\overline{ac}\|$.
Other possible definitions for distance are:

$$dist(\overline{ac}) := \max(|x_1-x_0|, |y_1-y_0|). \quad (*)$$

This definition, (*), is somewhat peculiar; it says the distance is defined to be the length of only the longer side.

$$dist(\overline{ac}) := |x_1-x_0|+|y_1-y_0|. \quad (**)$$

The definition, (**), of distance says it is just the sum of the two sides, forgetting the square root.

$$(***) dist(\overline{ac}) = \begin{cases} 1, & c \neq a, \\ 0, & c = a. \end{cases}$$

Definition, (***), is more peculiar, the distance between any two distinct points is always 1!

When we use finite sets of numbers, the peculiarities continue. Let's pick a field, $F_{16}$, with primitive element, alpha ($\alpha$), $\alpha^2 := \alpha+1$.

$0 = 0000$ $1 = 0001$ $\alpha = 0010$ $\alpha^2 = 0100$ $\alpha^3 = 1000$ $\alpha^4 = 0011$ $\alpha^5 = 0110$ $\alpha^6 = 1100$ $\alpha^7 = 1011$ $\alpha^8 = 0101$ $\alpha^9 = 1010$ $\alpha^{10} = 0111$ $\alpha^{11} = 1110$ $\alpha^{12} = 1111$ $\alpha^{13} = 1101$ $\alpha^{14} = 1001$ Or, $0 = 0*\alpha^3 + 0*\alpha^2 + 0*\alpha^1 + 0*\alpha^0$ $1 = 0*\alpha^3 + 0*\alpha^2 + 0*\alpha^1 + 1*\alpha^0$ $\alpha = 0*\alpha^3 + 0*\alpha^2 + 1*\alpha^1 + 0*\alpha^0$ $\alpha^2 = 0*\alpha^3 + 1*\alpha^2 + 0*\alpha^1 + 0*\alpha^0$ $\alpha^3 = 1*\alpha^3 + 0*\alpha^2 + 0*\alpha^1 + 0*\alpha^0$ $\alpha^4 := (\alpha+1)$ by definition $= 0*\alpha^3 + 0*\alpha^2 + 1*\alpha^1 + 1*\alpha^0$ $\alpha 5 = (\alpha^{4*}\alpha^1) = ((\alpha+1)*\alpha) = \alpha^2 + \alpha = 0*\alpha^3 + 1*\alpha^2 + 1*\alpha^1 + 0*\alpha^0$ $\alpha 6 = (\alpha^{4*}\alpha^2) = ((\alpha+1)*\alpha^2) = \alpha^3 + \alpha^2 = 1*\alpha^3 + 1*\alpha^2 + 0*\alpha^1 + 0*\alpha^0$ $\alpha 7 = (\alpha^{4*}\alpha^3) = ((\alpha+1)*\alpha^3) = \alpha^4 + \alpha^3 = 1*\alpha^3 + 0*\alpha^2 + 1*\alpha^1 + 1*\alpha^0$ and so forth . . . .

The "distance" between $\alpha^4$ and $\alpha$ is 1, since $\alpha^4 = \alpha+1$ implies $\alpha^4 - \alpha = (\alpha+1) - \alpha = 1$.
or using the coefficient bits:

$$\begin{array}{r}(0\ 0\ 1\ 1)\\ XOR\ (0\ 0\ 1\ 0)\\ \hline (0\ 0\ 1\ 0) = 1, \text{ the same as above.}\end{array}$$

Likewise the distance between $\alpha^8$ and $\alpha^4$ is $(\alpha^2+1)-(\alpha+1) = \alpha^2+\alpha$.
or using the bits:

$$\begin{array}{r}(0\ 0\ 1\ 1)\\ XOR\ (0\ 1\ 0\ 1)\\ \hline (0\ 1\ 1\ 0) = 1, \alpha^2 + \alpha, \text{ as above.}\end{array}$$

If we rearrange the table above by numerical order for the 4-digit binary numbers, we see a different context for order and distance:

$0 = 0000$ $1 = 0001$ $\alpha = 0010$ $\alpha^4 = 0011$ $\alpha^2 = 0100$ $\alpha^8 = 0101$ $\alpha^5 = 0110$ $\alpha^{10}=0111$ $\alpha^3=1000$ $\alpha^{14}=1001$ $\alpha^9=1010$ $\alpha^7=1011$ $\alpha^6=1100$ $\alpha^{13}=1101$ $\alpha^{11}=1110$ $\alpha^{12}=1111$ Still another way to look at the failure of detecting a spoof of Example 1. Suppose we have two messages, $m_1$ and $m_2$, that have the same CRC, say r. Then $r_1 = m_1 \pmod n$, for some $n$, and $r_1 = m_1 \pmod n$.

This implies $$m_2 = m_1 (\operatorname{mod} n)\langle = \rangle n \mid (m_2 - m_1) \begin{bmatrix} \text{by property of congruences,} \\ \text{and } r_1 = r_1 \end{bmatrix}.$$

$n \mid (m_2 - m_1)\langle = \rangle m_2 = m_1 + kn$, for some $k$.

$\langle = \rangle (m_2 + d) = (m_1 + d) + kn, \begin{bmatrix} d \text{ is a change made to} \\ \text{each message} \ldots \end{bmatrix}$ $\langle = \rangle n \mid ((m_2 + d) - (m_1 + d))$.

$\langle = \rangle (m_2 + d) = (m_1 + d)(\operatorname{mod} n)$.

So the remainder, say $r_2 = (m_2 + d) \pmod n$, is the same for each of the two modified messages □.

In general, an orthogonal transformation implies that the transformation in a Euclidean space preserves collinearity, distance, and perpendiculars. Rotations and translations of 3-space are examples. An affine transformation implies it preserves collinearity, but not distance and not perpendiculars, yet provides existence and uniqueness. Affine transformations are order-preserving for lines. A shear transformation is an example of an affine transformation that is not orthogonal. A Forward Error Correction (FEC) EDAC could be used with an affine transformation, since it is lossless. A more formal definition of an affine transformation (or affine morphism) is: A mapping $T: E^m \to E^m$ is called an affine transformation if there is an invertible m by m matrix A and a vector $b \in \Re^m$ such that, for all $x \in \Re^m$ $Tx = Ax + b$.

A non-invertible transform implies that it cannot be affine because of the existence criteria necessary to be an affine transformation. We define a non-axiomatic transformation to imply that it does not preserve collinearity, distance, or perpendiculars; and it doesn't imply either existence or uniqueness. A non-axiomatic transformation is for use with Automatic Repeat Request (ARQ) EDACs, for use fortifying identification signatures, or with other information assurance methods. A non-axiomatic transformation provides a mapping S:

$S: E^u \to E^v$.

We define a LangGanong Transform as a multiplication by a coefficient matrix of a P-linear system matrix created by using the LangGanong Theorem on a given Zariski surface. It is suggested that such a surface with a large genus would be preferred. For a trivial example of selecting a LangGanong Transform:

Let, $z^2 = xy^5 + y$ (be our Zariski surface), and $f = x$, so $p = 2$, and $g(x,y) = xy^5 + y$.

The degree of t is bounded by 4. We find $a_g$ from $a_g = D_g^P x / D_g x$, or from the LangGanong Theorem, $$a_g = g^0 \nabla^1 + g^1 \nabla g^0,$$
$$= \nabla g^1 = \nabla 1,$$
$$= y^4,$$

Then $$A = \begin{bmatrix} 0 & 0 & 0 & 0 & 1 & 0 & 0 & 0 & 0 & 0 & 0 & 0 & 0 & 0 & 0 \\ 0 & 0 & 0 & 0 & 0 & 0 & 1 & 0 & 0 & 0 & 0 & 0 & 0 & 0 & 0 \\ 0 & 0 & 0 & 0 & 1 & 0 & 0 & 0 & 0 & 0 & 0 & 0 & 0 & 0 & 0 \\ 0 & 0 & 0 & 0 & 0 & 0 & 1 & 0 & 0 & 0 & 0 & 0 & 0 & 0 & 0 \\ 0 & 0 & 0 & 0 & 0 & 0 & 0 & 0 & 0 & 0 & 0 & 0 & 0 & 1 & 0 \\ 0 & 0 & 0 & 0 & 0 & 0 & 0 & 0 & 0 & 0 & 0 & 0 & 0 & 1 & 0 \end{bmatrix},$$

and $C_2 = [0 \ 0 \ 0 \ 0 \ 1 \ 0 \ 0 \ 0 \ 0 \ 0 \ 0 \ 0 \ 0 \ 0 \ 0]$.

The transformation proceeds as is well known in the art.

Interleaving

Like distance, 'interleaving' has a different meaning is different contexts. In some prior art, the interleaving is used in cases where burst errors are prevalent, to spread sequential data around, so that the likelihood of a burst causing an undetectable or uncorrectable error is small. In the case of the tape drive EDAC patent, the edges of the tape were more susceptible to error, so the physical track numbers at edges were logically rearranged ('interleaved') to distribute the probability of error to other tracks. The triple orthogonal patent, 'interleaved' rows and/or columns of data, again to reduce the effects of burst errors. The turbo patent states several aims, summarized as: 1) very high corrective capacity, 2) efficient, 3) highly reliable decoding, 4) very high bit rates, 5) relatively easy manufacturer of coders and decoders, 6) requires only one clock, 7) high overall coding efficiency rate, 8) high-performance decoders, 9) implantation of the decoding method on a surface of silicon, 10) making numerous types of decoders, 11) profitable, 12) simple, and 13) for a wide variety of applications. These turbo codes are clearly fantastic. Again the usage in most of the embodiments, in the turbo patent covering interleaving, is to rearrange the sequential data, so as to improve the decoder's correction capacity, as one would expect from an EDAC method.

One goal of our interleaving is just to change the sequence of the data so that the encoding results in a distinct residue. By not restricting the interleave to be orthogonal, or linear, or possibly invertible, for a data message of a non-trivial size, the number of ways to interleave is greatly increased. In the non-axiomatic embodiment, it could be the result of a mapping (morphism, or relationship), $S:E^u \rightarrow E^v$.

where u>v, or u<v, the matrices S, W, A, and C are not invertible, for x∈ℜ$^u$ and for y∈ℜ$^v$, that is not one-to-one, not onto, such that $$SxW = \frac{Ay+b}{Cy+d}.$$

The only rule would be, that it is repeatable for a given input.

INDUSTRIAL APPLICABILITY

The presented apparatus and methods extend the capability of a given EDAC system and provide improved protection from cyber attacks on embedded systems for their life cycle. The apparatus and methods apply, also, to the secure delivery of other digital data.

In general, the invention identifies and ensures improved dependable execution of boot firmware in a computer system, by associating a simple extended signature at system development time, allowing recording and documentation of the signature during system verification and certification, monitoring and verifying the firmware in all aspects of the life cycle, such as, configuration management archival, field-loading verification, run-time verification, response to challenges by run-time health maintenance systems, verification at port of entry repositories, verification and traceability by certification authorities, history tracking by researchers, inside escrow archives, and in reuse in next generation systems. A large number of multiple distinct signatures are possible to be associated with the input digital data by using different transformations or distortions. The embodiment, addressing boot firmware is for illustration, and no restriction to its use on boot firmware digital data is implied.

REFERENCES

U.S. Patent References

| U.S. Pat. No. 3,786,439 | Jan. 15, 1974 | McDonald, et al. |
| U.S. Pat. No. 5,392,299 | Feb. 21, 1995 | Rhines, et al. |
| U.S. Pat. No. 5,446,747 | Aug. 29, 1995 | Berrou |
| U.S. Pat. No. 5,673,316 | Sep. 30, 1997 | Auerbach et al. |
| U.S. Pat. No. 4,821,268 | Apr. 11, 1989 | Berlekamp, et al. |
| U.S. Pat. No. 4,633,470 | Dec. 30, 1986 | Welch, et al. |
| U.S. Pat. No. 7,672,453 | Mar. 2, 2010 | Matolak |

Other References

[1] Cryptography and Decoding Reed-Solomon Codes as a Hard Problem, A. Kiayias, M. Yung, IEEE, 2005, 0-7803-9491-7/05.
[2] Keying Hash Functions for Message Authentication, M. Bellare, et al., Advances in Cryptography—Crypto 96 Proceedings, June 1996.
[3] Near Optimum Error Correcting Coding And Decoding: Turbo-Codes, C. Berrou, IEEE, 1996, 0090-6778/96.
[4] Factoring Large Numbers with the TWINKLE Device (Extended Abstract), A. Shamir, The Weizmann Institute of Science.
[5] A New Program for Computing the P-Linear System Cardinality that Determines the Group of Well Divisors of a Zariski Surface, C. Rogers, University of Kansas, 1995.
[6] Scientific American, vol. 206 #2, February 1962, pp. 96-108.
[7] Choosing a CRC & Specifying Its Requirements for Field-Loadable Software, C. Rogers, IEEE, 2008, 978-1-4224-2208-1/08.
[8] Proposing Improvements to Avoid the CRC Compromise and the Silent Specification, C. Rogers, IEEE, 2009, 978-1-4244-4078-8/09.

The invention claimed is:

1. A method of identifying and protecting the integrity of a set of source data, comprising the steps of:
   (a) passing the source data through a transformation utilizing at least one of an interleaver comprising a Forney interleaver, a 2-bit rotation, a criss-cross wiring matrix, a serial-to-parallel data converter whose output is interleaved by a criss-cross wiring matrix, a serial-to-parallel data converter whose output is interleaved by an M-by-N FLASH memory, parallel data lines input to an M-by-N FLASH whose output is interleaved by an M-by-N FLASH memory, an interleaver comprising a serial-to-parallel data converter whose output is interleaved by an M-by-N RAM memory, or parallel data lines input to an M-by-N RAM memory whose output is interleaved by an M-by-N RAM memory to produce a transformed set of source data, where m<n, m>n, or m=n;
   (b) distorting said transformed set of source data with a distortion function to produce an intermediate set of source data; and
   (c) passing the intermediate set of source data through an error detection and correction (EDAC) algorithm to produce a remainder and attaching said remainder to the set of source data to produce an encoded set of source data.

2. The method of claim 1, further comprising the step of passing the encoded set of source data through a second EDAC algorithm to produce a second remainder and attaching said second remainder to the encoded set of source data.

3. The method of claim 1 wherein said transformation comprises an interleaver comprising a 2-bit rotation.

4. The method of claim 1 wherein the distortion function of step (b) comprises an exclusive OR operation between said transformed set of source data and a binary pattern.

5. The method of claim 1 wherein said set of source data is an embedded set of source data.

6. The method of claim 5 wherein said remainder is calculated prior to embedding said set of source data.

7. The method of claim 1 wherein said transformation comprises an interleaver comprising a Forney interleaver.

8. The method of claim 1, wherein said transformation comprises an interleaver comprising a serial-to-parallel data converter whose output is interleaved by a criss-cross wiring matrix.

9. The method of claim 1, wherein said transformation comprises an interleaver comprising a serial-to-parallel data converter whose output is interleaved by an N-by-N FLASH memory.

10. The method of claim 1, wherein said transformation comprises an interleaver comprising a serial-to-parallel data converter whose output is interleaved by an N-by-N RAM memory.

11. The method of claim 4, wherein said binary pattern is extracted from an N-by-N RAM memory.

12. The method of claim 1, wherein said transformation comprises an affine transformation.

13. The method of claim 1, wherein said transformation comprises a non-axiomatic transformation.

14. The method of claim 1, wherein said transformation is selected from the group consisting of transforms without an inverse function, without preserving rigid motion, and a LangGanong Transform matrix.

15. The method of claim 2, wherein said EDAC algorithm and said second EDAC algorithm are the same.

16. The method of claim 2, wherein said EDAC algorithm and said second EDAC algorithm are different.

17. The method of claim 16, wherein said first EDAC algorithm comprises a first polynomial and said second EDAC algorithm comprises a second polynomial that is different from said first polynomial.

18. The method of claim 1 wherein said EDAC algorithm is selected from the group comprising a CRC algorithm, Reed-Solomon encoding, Viterbi algorithms, Turbo encoding, MD5 algorithms and SHA-1 hash algorithms.

19. The method of claim 5 wherein steps (a) and (b) are programmable.

20. The method of claim 17 wherein said remainders are verified periodically.

21. The method of claim 17 wherein said remainders are verified aperiodically.

22. The method of claim 1, further comprising the step of verifying the integrity of said source data comprising the steps of recalculating said remainder, comparing the recalculated value of said remainder with the value of said remainder calculated in step (c) and providing an indicator that the comparison shows that said remainder and said recalculated value of said remainder are not the same.

23. The method of claim 22, further comprising the step of providing said remainder to a sink.

24. The method of claim 23, wherein said sink is selected from the group consisting of a display means, placement on a serial bus, placement on a parallel bus, and control logic.

25. The method of claim 22, further comprising the step of providing said remainder in response to a request.

26. A computerized method of identifying and protecting the integrity of a set of source data utilizing a computer processor and a memory, comprising the steps of:
  (a) passing the source data through a transformation at the processor to produce a transformed set of source data stored at the memory;
  (b) distorting said transformed set of source data with a distortion function at the processor to produce an intermediate set of source data stored at the memory; and
  (c) passing the intermediate set of source data through an error detection and correction (EDAC) algorithm at the processor to produce a remainder and attaching said remainder to the set of source data stored at the memory to produce an encoded set of source data stored at the memory.

27. The method of claim 26, further comprising the step of passing the encoded set of source data through a second EDAC algorithm at the processor to produce a second remainder and attaching said second remainder to the encoded set of source data stored at the memory.

28. The method of claim 26, further comprising the step of verifying the integrity of said source data comprising the steps of recalculating said remainder at the processor, comparing the recalculated value of said remainder with the value of said remainder calculated in step (c) at the processor, and providing at an output device an indicator that the comparison shows that said remainder and said recalculated value of said remainder are not the same.

* * * * *